United States Patent
Ishibashi et al.

(10) Patent No.: US 11,901,827 B2
(45) Date of Patent: Feb. 13, 2024

(54) POWER CONVERSION DEVICE AND DC POWER DISTRIBUTION SYSTEM

(71) Applicant: Mitsubishi Electric Corporation, Tokyo (JP)

(72) Inventors: Takaharu Ishibashi, Tokyo (JP); Takushi Jimichi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 323 days.

(21) Appl. No.: 17/299,787

(22) PCT Filed: Jan. 21, 2019

(86) PCT No.: PCT/JP2019/001658
§ 371 (c)(1),
(2) Date: Jun. 4, 2021

(87) PCT Pub. No.: WO2020/152745
PCT Pub. Date: Jul. 30, 2020

(65) Prior Publication Data
US 2022/0123661 A1    Apr. 21, 2022

(51) Int. Cl.
*H02M 3/335* (2006.01)
*H02M 1/00* (2006.01)

(52) U.S. Cl.
CPC ..... *H02M 3/33584* (2013.01); *H02M 1/0058* (2021.05)

(58) Field of Classification Search
CPC .................. H02M 3/33584; H02M 1/0058
See application file for complete search history.

(56) References Cited

U.S. PATENT DOCUMENTS 8,891,254 B2 * 11/2014 Kominami ........ H02M 3/33584
  363/17
2008/0212340 A1    9/2008 Tao et al.
(Continued)

FOREIGN PATENT DOCUMENTS

JP    9-65509 A    3/1997
JP    9-84346 A    3/1997
(Continued)

OTHER PUBLICATIONS

International Search Report and Written Opinion dated Mar. 12, 2019, received for PCT Application PCT/JP2019/001658, Filed on Jan. 21, 2019, 9 pages including English Translation.
(Continued)

Primary Examiner — Rafael O De Leon Domenech
(74) Attorney, Agent, or Firm — XSENSUS LLP

(57) ABSTRACT

A multiwinding transformer includes a primary-side winding and a plurality of secondary-side windings. A primary-side bridge circuit to carry out DC/AC power conversion is connected between a primary-side DC terminal connected to a DC power supply and the primary-side winding. A plurality of secondary-side bridge circuits to carry out DC/AC power conversion are connected between the plurality of secondary-side windings and a plurality of secondary-side DC terminals, respectively. The plurality of secondary-side windings include a first secondary-side winding strongest in magnetic coupling to the primary-side winding and a second secondary-side winding weaker in magnetic coupling to the primary-side winding than the first secondary-side winding.

15 Claims, 15 Drawing Sheets

(56) References Cited

U.S. PATENT DOCUMENTS

| | | | |
|---|---|---|---|
| 2014/0103860 A1 | 4/2014 | Kominami et al. | |
| 2018/0183344 A1* | 6/2018 | Iwaya | H02M 3/33592 |
| 2019/0148973 A1* | 5/2019 | Kim | B60L 53/22 |
| | | | 320/109 |
| 2020/0112260 A1* | 4/2020 | Suzuki | H02M 3/33561 |

FOREIGN PATENT DOCUMENTS

| | | |
|---|---|---|
| JP | 2008-543271 A | 11/2008 |
| JP | 2013-251998 A | 12/2013 |
| JP | 2015-154506 A | 8/2015 |
| JP | 2017-175812 A | 9/2017 |
| WO | 2006/131870 A1 | 12/2006 |
| WO | 2013/179674 A1 | 12/2013 |

OTHER PUBLICATIONS

Decision of Refusal dated Mar. 10, 2020, received for JP Application 2019-532156, 20 pages including English Translation.
Notice of Reasons for Refusal dated Jul. 23, 2019, received for JP Application 2019-532156, 17 pages including English Translation.
Notice of Reasons for Refusal dated Nov. 19, 2019, received for JP Application 2019-532156, 19 pages including English Translation.

* cited by examiner

POWER CONVERSION DEVICE AND DC POWER DISTRIBUTION SYSTEM

CROSS-REFERENCE TO RELATED APPLICATION

The present application is based on PCT filing PCT/JP2019/001658, filed Jan. 21, 2019, the entire contents of which are incorporated herein by reference.

TECHNICAL FIELD

The present disclosure relates to a power conversion device and a direct-current (DC) power distribution system.

BACKGROUND ART

Japanese Patent National Publication No. 2008-543271 (PTL 1) describes a power converter to carry out DC/DC power conversion in which a bridge circuit is connected to each winding of a multiwinding transformer. PTL 1 proposes expansion of a soft-switching operating range for improvement in efficiency by controlling a half-cycle voltage time integral of a positive or negative part of a rectangular pulse wave provided from each bridge circuit to substantially be equal.

CITATION LIST

Patent Literature

PTL 1: Japanese Patent National Publication No. 2008-543271

SUMMARY OF INVENTION

Technical Problem

In the power converter described in PTL 1, however, efficiency is enhanced by expansion of application of soft switching, whereas transmission power transmitted from a primary-side winding to a secondary-side winding is affected not only by a phase difference between rectangular pulse waves provided from the bridge circuits but also by the half-cycle voltage time integral of the positive or negative part of the rectangular pulse waves. Therefore, there is a concern about complicated power control.

The present disclosure was made to solve such a problem, and enhances efficiency without complicated control in a power conversion device to provide DC power to a plurality of loads by means of a multiwinding transformer including a plurality of secondary-side windings.

Solution to Problem

According to one aspect of the present disclosure, a power conversion device includes a multiwinding transformer, a primary-side DC terminal connected to a DC power supply, a plurality of secondary-side DC terminals, a primary-side bridge circuit, and a plurality of secondary-side bridge circuits. The multiwinding transformer includes a primary-side winding and a plurality of secondary-side windings. The primary-side bridge circuit is connected between the primary-side DC terminal and the primary-side winding, and carries out direct-current (DC)/alternating current (AC) power conversion. The plurality of secondary-side bridge circuits are connected between the plurality of secondary-side windings and the plurality of secondary-side DC terminals, respectively, and carry out AC/DC power conversion. The plurality of secondary-side windings include a first secondary-side winding strongest in magnetic coupling to the primary-side winding and a second secondary-side winding weaker in magnetic coupling to the primary-side winding than the first secondary-side winding. The plurality of secondary-side DC terminals include a first secondary-side DC terminal and a second secondary-side DC terminal. The first secondary-side DC terminal is electrically connected to the first secondary-side winding with a first secondary-side bridge circuit of the plurality of secondary-side bridge circuits being interposed. The second secondary-side DC terminal is electrically connected to the second secondary-side winding with a second secondary-side bridge circuit of the plurality of secondary-side bridge circuits being interposed.

Advantageous Effects of Invention

According to the present disclosure, by providing intentional difference in magnetic coupling to the primary-side winding among the plurality of secondary-side windings in the power conversion device to provide DC power to the plurality of loads by means of the multiwinding transformer including the plurality of secondary-side windings, a specific secondary-side DC terminal minimum in power loss during power transmission from the DC power supply to the plurality of secondary-side DC terminals can be provided. Therefore, by providing the specific secondary-side DC terminal suitable for connection of a load maximum in consumed power in an application where the plurality of loads are different from one another in consumed power, efficiency can be enhanced without complicated control.

DESCRIPTION OF EMBODIMENTS

Figure 1:
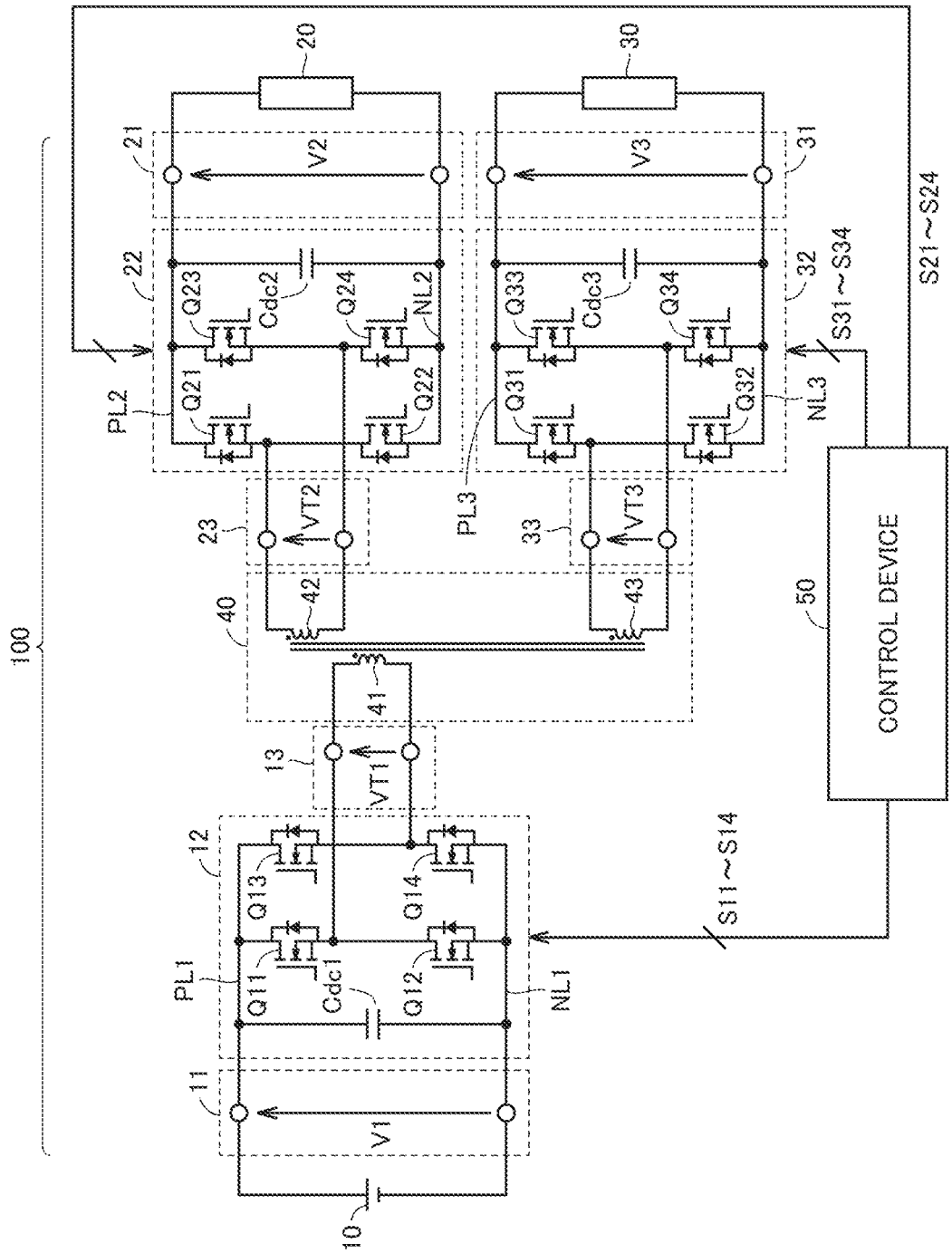
FIG. 1 is a circuit diagram showing an exemplary configuration of a power conversion device according to a first embodiment.

An exemplary embodiment of a power conversion device will be described below in detail with reference to the drawings. The disclosed invention is not limited by the present embodiment, and embodiments can be combined as appropriate so long as processing contents are consistent. The same or corresponding elements below have the same reference characters allotted and description will not be repeated in principle.

First Embodiment

In a first embodiment, a DC/DC converter including a multiwinding transformer including three windings and three bridge circuits connected to the three respective windings will be described as an exemplary power conversion device according to the present embodiment.

FIG. 1 is a circuit diagram showing an exemplary configuration of a power conversion device according to the first embodiment.

Referring to FIG. 1, a power conversion device 100 according to the first embodiment includes a first DC terminal 11, a second DC terminal 21, and a third DC terminal 31 and a first bridge circuit 12, a second bridge circuit 22, and a third bridge circuit 32. Power conversion device 100 further includes a first AC terminal 13, a second AC terminal 23, and a third AC terminal 33, a multiwinding transformer 40 (which will also simply be referred to as a transformer 40 below) including windings 41 to 43, and a control device 50.

DC power from a DC power supply 10 is provided to first DC terminal 11. An output voltage from DC power supply 10, that is, an input voltage to first DC terminal 11, will be referred to as a DC voltage V1 below. First bridge circuit 12 includes a DC capacitor Cdc1 and semiconductor switching elements (which will simply be referred to as a "switching element" below) Q11 to Q14.

DC capacitor Cdc1 is connected between a power line PL1 connected to a positive side of first DC terminal 11 and a power line NL1 connected to a negative side of first DC terminal 11. In other words, DC capacitor Cdc1 is connected in parallel to DC power supply 10 with first DC terminal 11 being interposed.

Switching elements Q11 and Q12 form a switching leg as being connected in series between power lines PL1 and NL1. Switching elements Q13 and Q14 form, in parallel to switching elements Q11 and Q12, another switching leg as being connected in series between power lines PL1 and NL1. An intermediate connection point between switching elements Q11 and Q12 and an intermediate connection point between switching elements Q13 and Q14 are connected to first AC terminal 13 connected to winding 41.

Second bridge circuit 22 includes switching elements Q21 to Q24 and a DC capacitor Cdc2. Switching elements Q21 and Q22 form a switching leg as being connected in series between a power line PL2 connected to a positive side of second DC terminal 21 and a power line NL2 connected to a negative side of second DC terminal 21. Switching elements Q23 and Q24 form, in parallel to switching elements Q21 and Q22, another switching leg as being connected in series between power lines PL2 and NL2. An intermediate connection point between switching elements Q21 and Q22 and an intermediate connection point between switching elements Q23 and Q24 are connected to second AC terminal 23 connected to winding 42. DC capacitor Cdc2 is connected between power lines PL2 and NL2 and connected in parallel to second DC terminal 21.

A load 20 is connected to second DC terminal 21. DC power can thus be supplied to load 20. An output voltage from second DC terminal 21 is also referred to as a DC voltage V2 below. DC voltage V2 varies with respect to a rated output voltage from second DC terminal 21, in accordance with power consumed by load 20.

Third bridge circuit 32 includes switching elements Q31 to Q34 and a DC capacitor Cdc3. Since connection relation of switching elements Q31 to Q34 and DC capacitor Cdc3 with a power line PL3 connected to a positive side of third DC terminal 31 and a power line NL3 connected to a negative side of third DC terminal 31 is similar to connection relation of switching elements Q21 to Q24 and DC capacitor Cdc2 with power lines PL2 and NL2 in second bridge circuit 22, detailed description will not be repeated.

In third bridge circuit 32, an intermediate connection point between switching elements Q31 and Q32 and an intermediate connection point between switching elements Q33 and Q34 are connected to third AC terminal 33 connected to winding 43.

A load 30 is connected to third DC terminal 31. DC power can thus be supplied to load 30. An output voltage from third DC terminal 31 is also referred to as a DC voltage V3 below. DC voltage V3 varies with respect to a rated output voltage from third DC terminal 31, in accordance with power consumed by load 30.

In transformer 40, winding 41 is also referred to as a primary-side winding 41 below and windings 42 and 43 are also referred to as secondary-side windings 42 and 43 below. First DC terminal 11 is also referred to as primary-side DC terminal 11. Second DC terminal 21 and third DC terminal 31 are also referred to as secondary-side DC terminals 21 and 31. First bridge circuit 12 is also referred to as primary-side bridge circuit 12. Second bridge circuit 22 and third bridge circuit 32 are also referred to as secondary-side bridge circuits 22 and 32. In the present embodiment, a DC power distribution system to supply DC power to a plurality of loads 20 and 30 by means of power conversion device 100 by connection of the plurality of loads 20 and 30 to a plurality of secondary-side DC terminals including second DC terminal 21 and third DC terminal 31 can be configured.

In the present embodiment, a semiconductor switching element with a self-arc-extinguishing function such as an insulated gate bipolar transistor (IGBT) or a metal oxide semiconductor field effect transistor (MOSFET) in which a diode is connected in anti-parallel can be employed for switching elements Q11 to Q14, Q21 to Q24, and Q31 to Q34. A plurality of semiconductor switching elements combined in parallel depending on a current capacity can also be employed for each of switching elements Q11 to Q14, Q21 to Q24, and Q31 to Q34.

Control device 50 is representatively implemented by a microcomputer and controls operations of power conversion device 100 by hardware processing by embedded electronic circuitry (not shown) and software processing by execution of an installed program by a not-shown central processing unit (CPU). Specifically, control device 50 controls switching (on and off) of switching elements Q11 to Q14, Q21 to Q24, and Q31 to Q34 by generating gate signals S11 to S14 to control on and off of switching elements Q11 to Q14, gate signals S21 to S24 to control on and off of switching elements Q21 to Q24, and gate signals S31 to S34 to control on and off of switching elements Q31 to Q34.

First bridge circuit 12 carries out bidirectional DC/AC power conversion between DC voltage V1 of first DC terminal 11 and an AC voltage VT1 of first AC terminal 13 by controlling switching of switching elements Q11 to Q14.

Second bridge circuit 22 carries out bidirectional AC/DC power conversion between an AC voltage VT2 of second AC terminal 23 and a DC voltage V2 of second DC terminal 21 by controlling switching of switching elements Q21 to Q24. Similarly, third bridge circuit 32 carries out bidirectional AC/DC power conversion between an AC voltage VT3 of third AC terminal 33 and a DC voltage V3 of third DC terminal 31 by controlling switching of switching elements Q31 to Q34. AC voltages VT1 to VT3 correspond to voltages applied to respective windings 41 to 43.

Power conversion device 100 can thus supply DC power at different voltage levels to loads 20 and 30 by carrying out in parallel, DC/DC power conversion to convert DC voltage V1 from DC power supply 10 to DC voltage V2 by means of first bridge circuit 12, transformer 40, and second bridge circuit 22 and DC/DC power conversion to convert DC voltage V1 from DC power supply 10 to DC voltage V3 by means of first bridge circuit 12, transformer 40, and third bridge circuit 32.

For turning on and off switching elements Q11 to Q14, Q21 to Q24, and Q31 to Q34 in first bridge circuit 12 to third bridge circuit 32, zero voltage switching representing exemplary soft switching can be applied by using an inductance element present between each of first bridge circuit 12 to third bridge circuit 32 and transformer 40 or a leakage inductance of transformer 40. By applying soft switching, reduction in switching loss and reduction in size of transformer 40 by using a higher frequency can be achieved.

When an operating frequency of switching elements Q11 to Q14, Q21 to Q24, and Q31 to Q34 is raised (for example, 61 Hz or higher) for reduction in size of transformer 40, loss (iron loss) increases in transformer 40. Increase in loss by raising a frequency, however, can be suppressed by employing an amorphous material, a silicon steel plate containing 6.5% of silicon, or a silicon steel plate having a thickness of approximately 0.1 mm as a core material.

An electrolytic capacitor or a film capacitor can be applied as DC capacitors Cdc1, Cdc2, and Cdc3. Though a current at a high frequency flows through DC capacitors Cdc1, Cdc2, and Cdc3, application of the film capacitor suppresses deterioration by the current at the high frequency and can achieve longer lifetime.

Figure 2:
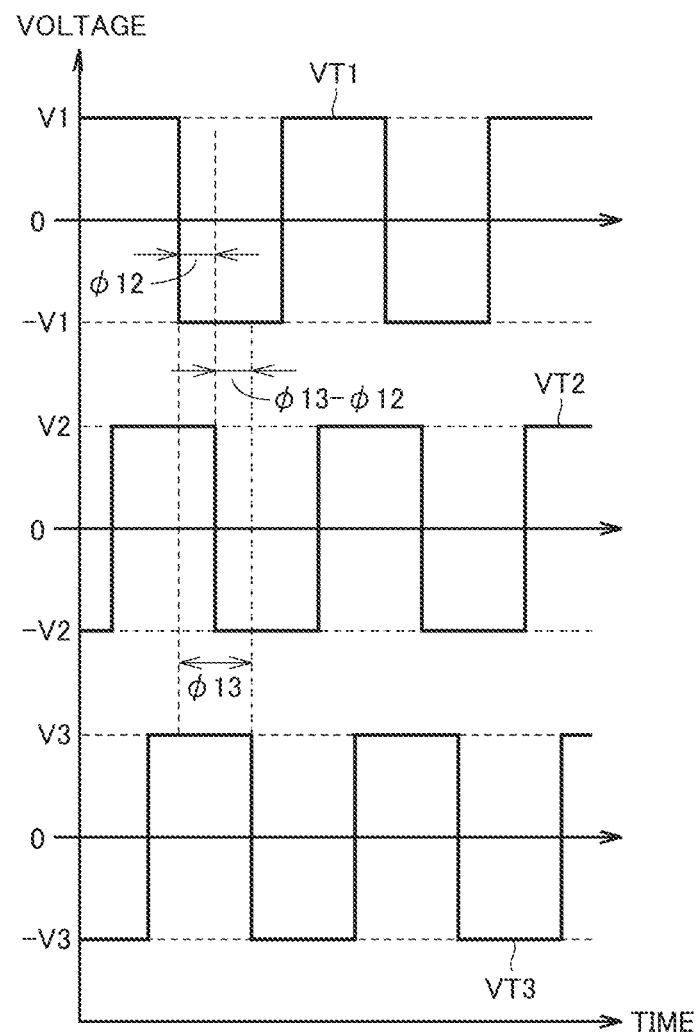
FIG. 2 is a waveform diagram of an AC voltage of each winding of a transformer in FIG. 1.

FIG. 2 is a waveform diagram of AC voltages VT1 to VT3 of windings 41 to 43 of transformer 40.

Referring to FIG. 2, AC voltage VT1 is a rectangular pulse voltage having DC voltage V1 as an amplitude by controlling switching of switching elements Q11 to Q14. Similarly, AC voltage VT2 is a rectangular pulse voltage having DC voltage V2 as an amplitude by controlling switching of switching elements Q21 to Q24. AC voltage VT3 is a rectangular pulse voltage having DC voltage V3 as an amplitude by controlling switching of switching elements Q31 to Q34. AC voltages VT1 to VT3 have a common frequency corresponding to the operating frequency (switching frequency) of switching elements Q11 to Q14, Q21 to Q24, and Q31 to Q34.

A phase difference $\phi 12$ can be provided between AC voltage VT1 provided by first bridge circuit 12 and AC voltage VT2 provided by second bridge circuit 22, by adjustment among gate signals S11 to S14 and gate signals S21 to S24. Similarly, a phase difference $\phi 13$ can be provided between AC voltage VT1 provided by first bridge circuit 12 and AC voltage VT3 provided by third bridge circuit 32, by adjustment among gate signals S11 to S14 and gate signals S31 to S34.

Consequently, a phase difference ($\phi 13 - \phi 12$) is produced between AC voltage VT2 provided by second bridge circuit 22 and AC voltage VT3 provided by third bridge circuit 32. In power conversion device 100, transmission power to loads 20 and 30 is controlled by controlling each phase difference. In this case, output power P1 from first bridge circuit 12 is expressed in an expression (1) below.

$$P1 = V1 \cdot V2/K_{12} \cdot \phi 12 \cdot (1 - \phi 12/\pi) + V1 \cdot V3/K_{13} \cdot \phi 13 \cdot (1 - \phi 13/\pi) \quad (1)$$

Constants $K_{12}$ and $K_{13}$ in the expression (1) are expressed below, by using an operating frequency fs of each switching element, a leakage inductance LS12 between windings 41 and 42, and a leakage inductance LS13 between windings 41 and 43.

$$K_{12} = 2\pi \cdot fs \cdot LS12$$

$$K_{13} = 2\pi \cdot fs \cdot LS13$$

Reception power P12 received by second bridge circuit 22 from first bridge circuit 12 is expressed in an expression (2) below.

$$P12 = V1 \cdot V2/K_{12} \cdot \phi 12 \cdot (1 - \phi 12/\pi) \quad (2)$$

Similarly, reception power P13 received by third bridge circuit 32 from first bridge circuit 12 is expressed in an expression (3) below.

$$P13 = V1 \cdot V2/K_{13} \cdot \phi 13 \cdot (1 - \phi 13/\pi) \quad (3)$$

In power conversion device 100, electric power is transmitted from a side where the phase difference is advanced to a side where the phase difference is retarded. In the example in FIG. 2, electric power is transmitted from primary-side bridge circuit (on a power supply side) 12 to each of secondary-side bridge circuits (on a load side) 22 and 32 as a result of advance of the phase of AC voltage VT1 relative to the phases of AC voltage VT2 and AC voltage VT3.

Furthermore, electric power is transmitted and received also between second bridge circuit 22 and third bridge circuit 32 owing to a phase difference produced between AC voltages VT2 and VT3. For example, as AC voltage VT2 is advanced in phase relative to AC voltage VT3, transmission power P23 from second bridge circuit 22 to third bridge circuit 32 is generated. Transmission power P23 is expressed in an expression (4) below.

$$P23 = V2 \cdot V2/K_{23} \cdot (\phi 13 - \phi 12) \cdot (1 - (\phi 13 - \phi 12)/\pi) \quad (4)$$

A constant $K_{23}$ in the expression (4) is expressed below, by using operating frequency fs of each switching element and a leakage inductance LS23 between windings 42 and 43.

$$K_{23} = 2\pi \cdot fs \cdot LS23$$

Therefore, output power P2 from second DC terminal 21 to load 20 and output power P3 from third DC terminal 31 to load 30 are expressed in an expression (5) and an expression (6) below.

$$P2 = P12 - P23 \quad (5)$$

$$P3 = P13 + P23 \quad (6)$$

Based on the above, electric power P23 is transmitted and received between secondary-side bridge circuits 22 and 23 where power transmission and power reception should not occur, which is called a cross current. As is understood from the expressions (5) and (6), output power P2 and P3 to loads 20 and 30 is affected by the cross current. Therefore, for controlling output power P2 and P3, control device 50 should control phase differences φ12 and φ13 in consideration of the cross current. When the cross current is produced, electric power higher than originally necessary reception power is received from DC power supply 10. Therefore, there is a concern about increase in loss in power conversion device 100.

With attention being paid to the expressions (1) to (3) above, electric power P12, P13, and P23 transmitted and received among bridge circuits 12, 22, and 32 is understood as being in inverse proportion to leakage inductances LS12, LS13, and LS23 among the windings. Specifically, as the leakage inductance between the windings is larger, electric power transmitted and received between the bridge circuits through the windings is reduced.

In an ideal transformer, windings are completely magnetically coupled to each other. Therefore, for example, as a result of propagation of all magnetic fluxes created by the primary-side winding through the core and resultant linkage to the secondary-side winding, an AC voltage is generated in the secondary-side winding. In an actual transformer, however, magnetic coupling between the windings is not complete. Approximately several (%) of magnetic fluxes created by the primary-side winding leaks to the outside of the core, and as a result of linkage of the leaked magnetic fluxes to the secondary-side winding, an inductance component called a leakage inductance is produced.

In other words, the leakage inductance is smaller in value as magnetic coupling between the windings is stronger. According to the expressions (1) and (2), as leakage inductances LS12 and LS13 are smaller, reception power P12 and P13 with respect to identical values of V1·V2 and V1·V3 increases and hence electric power can efficiently be transmitted. On the other hand, it is understood according to the expression (3) that, as leakage inductance LS23 between windings 42 and 43 is larger, transmission power P23, that is, the cross current, can be suppressed.

Therefore, in power conversion device 100 according to the first embodiment, by appropriately setting the leakage inductance of transformer 40, improvement in efficiency owing to suppression of power loss in power transmission can be achieved.

Figure 3:
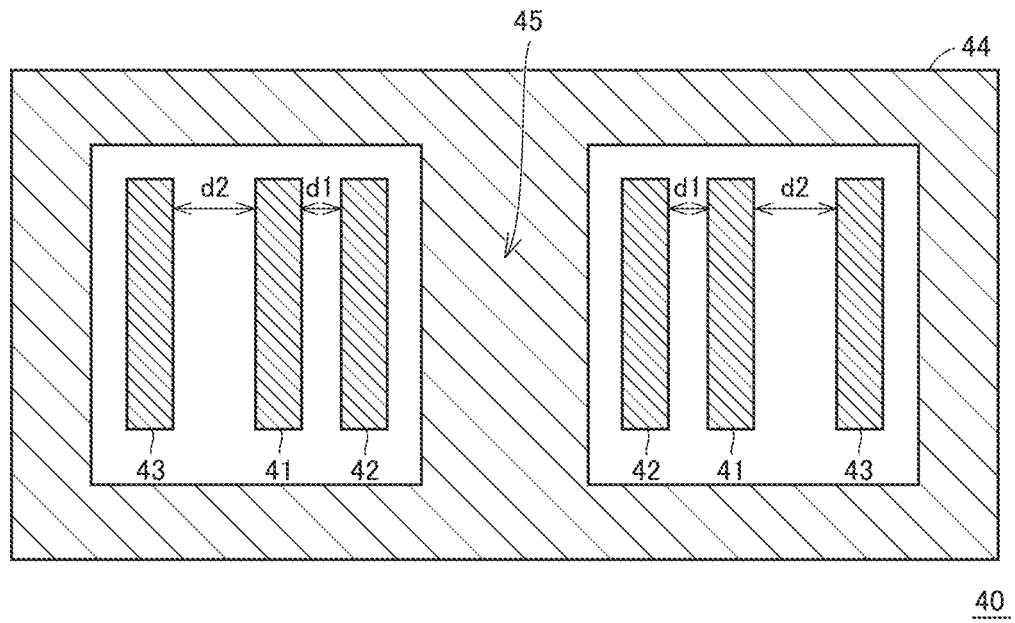
FIG. 3 is a front cross-sectional view illustrating an exemplary configuration of the transformer shown in FIG. 1.
Figure 4:
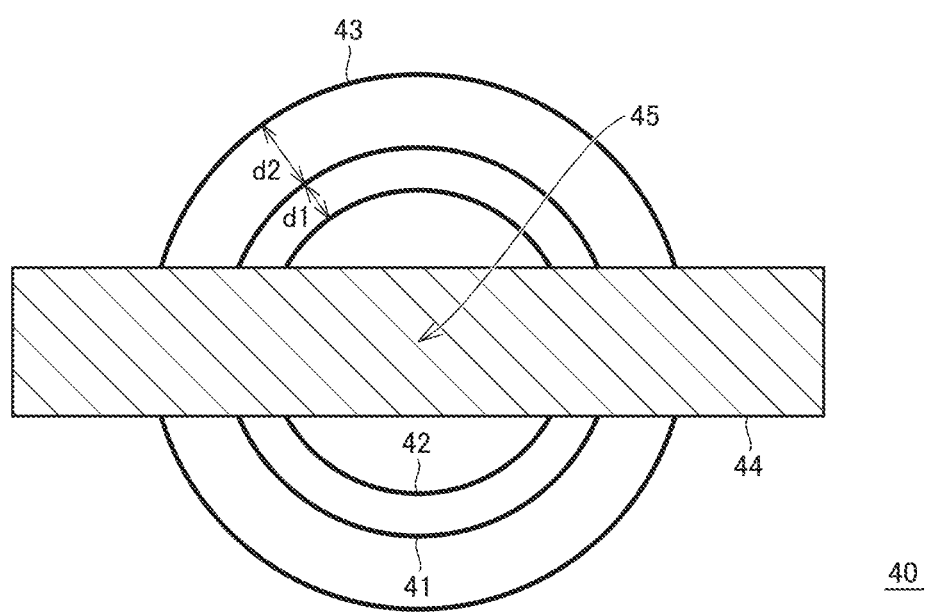
FIG. 4 is a top view of the transformer shown in FIG. 3.

FIG. 3 shows a front cross-sectional view illustrating an exemplary configuration of transformer 40. FIG. 4 shows a top view of transformer 40 shown in FIG. 3.

Referring to FIGS. 3 and 4, transformer 40 includes a primary-side (power supply-side) winding 41, two secondary-side (load-side) windings 42 and 43, and a core 44. A magnetic leg 45 is provided in core 44. Each of primary-side (power supply-side) winding 41 and secondary-side (load-side) windings 42 and 43 is wound around magnetic leg 45 of core 44.

At this time, by arranging secondary-side winding 42, primary-side winding 41, and secondary-side winding 43 sequentially from the inside around magnetic leg 45, magnetic coupling between primary-side winding 41 and secondary-side winding 42 becomes stronger. Furthermore, by setting relation between an inter-winding distance d1 between secondary-side winding 42 and primary-side winding 41 and an inter-winding distance d2 between secondary-side winding 43 and primary-side winding 41 to d1<d2, magnetic coupling between primary-side winding 41 and secondary-side winding 42 becomes strongest.

In the exemplary configuration shown in FIGS. 3 and 4, primary-side winding 41 is arranged between secondary-side windings 42 and 43. Therefore, the number of magnetic fluxes interlinked to primary-side winding 41 among magnetic fluxes created by secondary-side winding 42 is larger whereas the number of magnetic fluxes interlinked to secondary-side winding 43 is smaller. Furthermore, since the inter-winding distance between secondary-side windings 42 and 43 is calculated as (d1+d2), it is longer than each of d1 and d2. Consequently, magnetic coupling between secondary-side winding 42 and secondary-side winding 43 is weaker than each of magnetic coupling between primary-side winding 41 and secondary-side winding 42 and magnetic coupling between primary-side winding 41 and secondary-side winding 43. Consequently, since the leakage inductance between primary-side winding 41 and secondary-side winding 43, that is, leakage inductance LS23 in the expression (3), can be increased, transmission power P23 between secondary-side bridge circuits 22 and 23, that is, the cross current, can be suppressed.

In the exemplary configuration shown in FIGS. 3 and 4, magnetic coupling between primary-side winding 41 and secondary-side winding 42 is strongest. Therefore, LS23 among leakage inductances LS12, LS13, and LS23 in the expressions (1) to (3) is largest as described above, whereas leakage inductance LS12 between primary-side winding 41 and secondary-side winding 42 is smallest (LS23>LS13>LS12). Therefore, electric power can be transmitted from DC power supply 10 more efficiently to load 20 connected to second DC terminal 21 than to load 30 connected to third DC terminal 31.

Therefore, in transmission of electric power to a plurality of loads different in power rating from one another by means of power conversion device 100, a load higher in power rating (for example, an air conditioner or an elevator) can be connected as a load to second DC terminal 21, whereas a load lower in power rating (for example, a lighting fixture) can be connected as load 30 to third DC terminal 31. Electric power can thus efficiently be transmitted to load 20 higher in consumed power. Alternatively, load 20 can also be selected based on a maximum value or an average value of consumed power instead of rated electric power.

In exchange for decrease in leakage inductance LS12, leakage inductances LS13 and LS23 increase. Therefore, power transmission from DC power supply 10 to load 30 connected to third DC terminal 31 is lower in efficiency than power transmission to load 20. By enhancing efficiency in power transmission to load 20 higher in consumed power, however, a ratio of lost power to total transmission power to load 20 and load 30 is expected to be lower than in an example where leakage inductances LS12 and LS13 are uniformly designed. Furthermore, by increasing leakage inductance LS23, the cross current, that is, transmission power P23 between secondary-side bridge circuits 22 and 32, is lowered. Consequently, efficiency in power conversion device 100 as a whole can be enhanced.

Thus, according to the power conversion device in the first embodiment, by intentionally providing difference in magnetic coupling (that is, the leakage inductance) between the primary-side winding and each of the plurality of secondary-side windings of the multiwinding transformer to form a specific secondary-side DC terminal suitable for connection of a load higher in consumed power, power loss can be reduced and the cross current between the secondary side (load-side) bridge circuits can be suppressed. Consequently, efficiency can be enhanced in the power conversion device including the multiwinding transformer and the bridge circuit without complicated control in each bridge circuit.

Though magnetic coupling (leakage inductance) is differentiated by differentiating a distance between the windings in the present embodiment, magnetic coupling (leakage inductance) can also be differentiated by another approach such as adjustment of the number of turns or a size of a core window. "Intentional difference" in the present embodiment means, for example, providing difference exceeding an allowable tolerance (for example, ±10(%)) in the multiwinding transformer under such specifications that magnetic coupling (leakage inductance) among the windings is equal.

Second Embodiment

In the first embodiment, a technique for enhancing efficiency in power transmission to load 20 (which is also referred to as a maximum load 20 below) connected to second DC terminal 21 connected to secondary-side winding 42 small in leakage inductance between secondary-side winding 42 and the primary-side winding is mainly described. In a second embodiment, power conversion device 100 is further enhanced in efficiency by efficient transmission of electric power also to load 30 connected to third DC terminal 31 connected to the secondary-side winding large in leakage inductance between that secondary-side winding and the primary-side winding.

In the second embodiment, it is assumed that second DC terminal 21 and third DC terminal 31 on the secondary side (on the load side) are different from each other in rated output voltage and that different DC voltages are supplied to loads 20 and 30. In contrast, in the first embodiment, second DC terminal 21 and third DC terminal 31 on the secondary side (on the load side) may be equal to or different from each other in rated output voltage.

In the power conversion device according to the second embodiment, a nominal value of DC voltage V1 (that is, a rated output voltage from DC power supply 10) is set to be substantially equal to a rated output voltage of second DC terminal 21 (that is, a nominal value of DC voltage V2) connected to the maximum load. Furthermore, it is assumed below that a rated output voltage of third DC terminal 31 (that is, a nominal value of DC voltage V3) is lower than voltages V1 and V2.

In power conversion device 100 according to the first embodiment, a maximum value $IL_{12p}$ of an AC current IL12 within first bridge circuit 12 in power transmission to maximum load 20 connected to second DC terminal 21 can be expressed in an expression (7) below.

$$IL_{12p}=IL_{120}+A_{12}\cdot\phi12 \tag{7}$$

$A_{12}$ in the expression (7) is expressed as $A_{12}=(V1+V2)/K_{12}$ by using $K_{12}$ in common to the expression (1). In addition, $IL_{120}$ is expressed in an expression (8) below, by further using $B_{12}=(V1-V2)/K_{12}$.

$$IL_{120}=(\tfrac{1}{2})\cdot\{(A_{12}-B_{12})\cdot\phi12+B_{12}\cdot\pi\} \tag{8}$$

Similarly, a maximum value $IL_{13p}$ of an AC current IL13 within first bridge circuit 12 in power transmission to load 30 connected to third DC terminal 31 can be expressed in an expression (9) below.

$$IL_{13p}=IL_{130}+A_{13}\cdot\phi13 \tag{9}$$

$A_{13}$ in the expression (9) is expressed as $A_{13}=(V1+V3)/K_{13}$ by using $K_{13}$ in common to the expression (1). In addition, $IL_{130}$ is shown in an expression (10) below, by further using $B_{13}=(V1-V3)/K_{13}$.

$$IL_{130}=(\tfrac{1}{2})\cdot\{(A_{13}-B_{13})\cdot\phi13+B_{13}\cdot\pi\} \tag{10}$$

Furthermore, as described in the first embodiment, the cross current between second bridge circuit 22 and third bridge circuit 32 is suppressed. Therefore, a current maximum value within second bridge circuit 22 is substantially equal to maximum value $IL_{12p}$ of AC current IL12 in the expression (7). Similarly, a current maximum value within third bridge circuit 32 is substantially equal to maximum value $IL_{13p}$ of AC current IL13 in the expression (9).

A current effective value $IL_{12rms}$ for second bridge circuit 22 on the load side can be expressed in an expression (11) below, as a cubic function of phase difference $\phi12$.

$$IL_{12rms}=\sqrt{\{C_3\cdot\phi12^3+C_2\cdot\phi12^2+C_1\cdot\phi12+C_0\}/\pi} \tag{11}$$

Coefficients $C_3$ to $C_1$ and a constant $C_0$ in the expression (11) are shown below, by using $IL_{12p}$, $IL_{120}$, $A_{12}$, and $B_{12}$ in common to the expressions (7) and (8).

$$C_3=(A_{12}^2-B_{12}^2)/3$$

$$C_2=A_{12}\cdot IL_{120}+B_{12}^2\cdot\pi+B_{12}\cdot IL_{12p}$$

$$C_1=IL_{120}^2+B_{12}^2\cdot\pi^2-2B_{12}\cdot IL_{12p}\cdot\pi-IL_{12p}^2$$

$$C_0=B_{12}^2\cdot\pi^3/3+B_{12}\cdot IL_{12p}\cdot\pi^2$$

Similarly, a current effective value $IL_{13rms}$ for third bridge circuit 32 on the load side can be expressed in an expression (12) below as a cubic function of phase difference $\phi13$.

$$IL_{13rms}=\sqrt{\{D_3\cdot\phi13^3+D_2\cdot\phi13^2+D_1\cdot\phi13+D_0\}/\pi} \tag{12}$$

Coefficients $D_3$ to $D_1$ and constant Do in the expression (12) are shown below, by using $IL_{13p}$, $IL_{130}$, $A_{13}$, and $B_{13}$ in common to the expressions (9) and (10).

$$D_3=(A_{13}^2-B_{13}^2)/3$$

$$D_2=A_{13}\cdot IL_{130}+B_{13}^2\cdot\pi+B_{13}\cdot IL_{13p}$$

$$D_1=IL_{130}^2+B_{13}^2\cdot\pi^2-2B_{13}\cdot IL_{13p}\cdot\pi-IL_{13p}^2$$

$$D_0=B_{13}^2\cdot\pi^3/3+B_{13}\cdot IL_{13p}\cdot\pi^2$$

Figure 5:
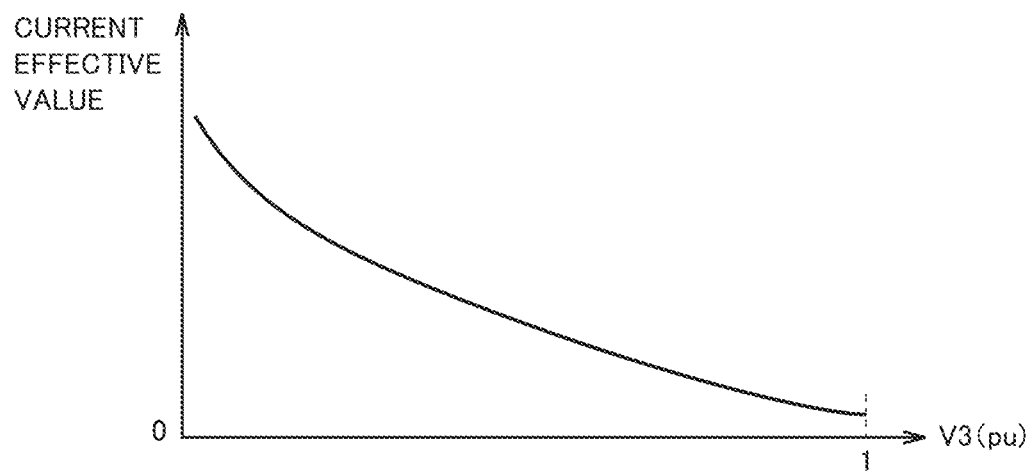
FIG. 5 shows a graph illustrating relation between an output voltage of a third DC terminal and a current in a third bridge circuit.

FIG. 5 shows a graph illustrating relation between DC voltage V3 of third DC terminal 31 and a current in third bridge circuit 32. The ordinate in FIG. 5 represents current effective value $IL_{13rms}$ in third bridge circuit 32 shown in the expression (12).

The abscissa in FIG. 5 represents DC voltage V3 as (pu) with DC voltage V1 being defined as the reference. Specifically, in FIG. 5, V3=1 (pu) represents relation of V3=V1. Since a condition of V3<V1 is assumed as described above, FIG. 5 shows characteristics of current effective value $IL_{13rms}$ by plotting values obtained from the expression (12) for a range of V3<1 (pu).

As is understood from FIG. 5, as DC voltage V3 is lower as compared with DC voltage V1, in other words, as a voltage difference between DC voltage V1 and DC voltage V3 is larger, current effective value $IL_{13rms}$ is larger. With increase in current effective value, power loss increases, which results in lower efficiency of power conversion device 100. Increase in cost for equipment due to increase in capacity of an element is also a concern.

Therefore, in the second embodiment, a configuration for highly efficiently transmitting electric power to load 30 other than the maximum load by determining a turns ratio among windings 41 to 43 of transformer 40 in accordance with relation between a rated output voltage of second DC terminal 21 (that is, a nominal value of an input voltage to load 20 which is the maximum load) and a rated output voltage of third DC terminal 31 (that is, a nominal value of an input voltage to load 30) will be described.

Figure 6:
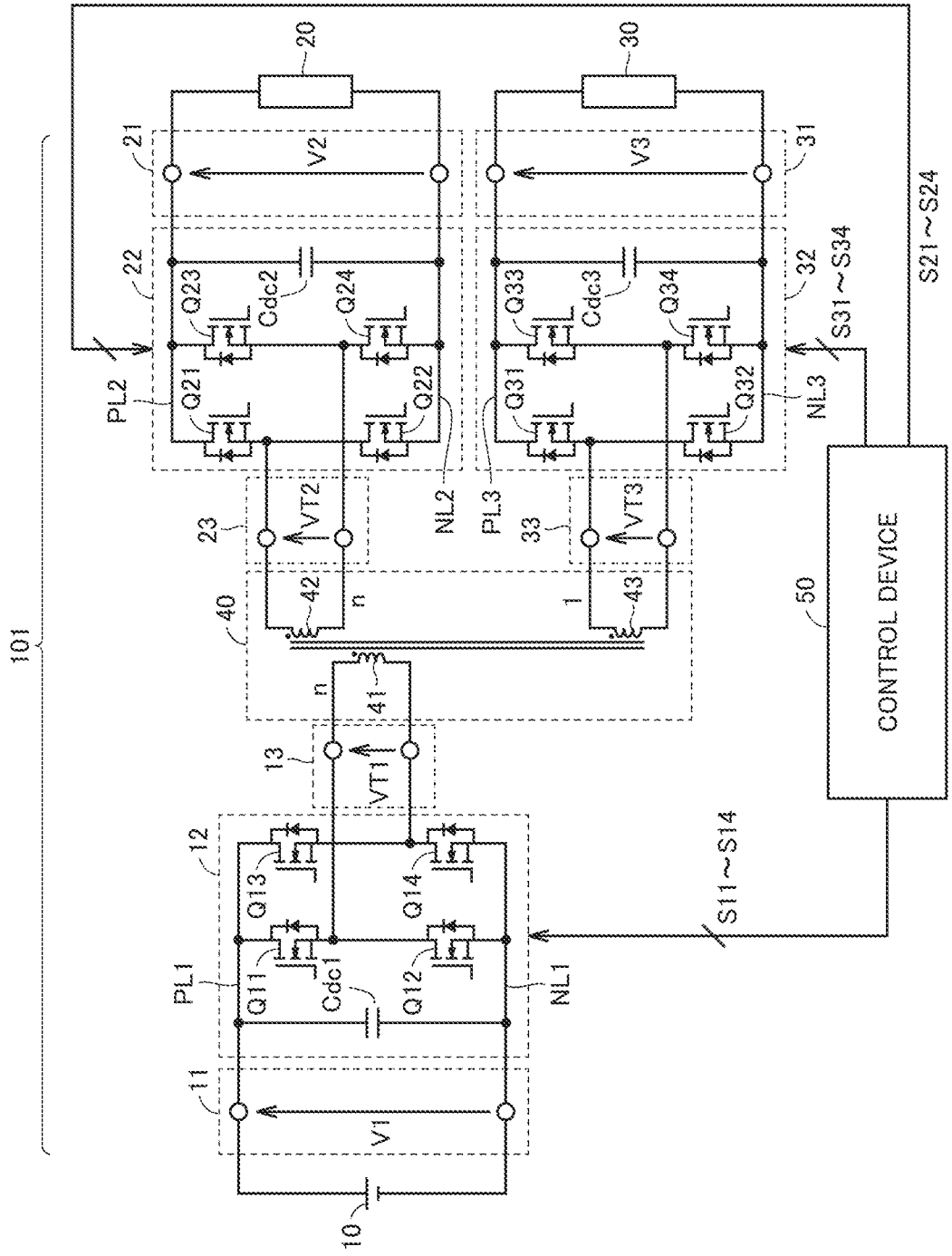
FIG. 6 is a circuit diagram showing an exemplary configuration of a power conversion device according to a second embodiment.

FIG. 6 is a circuit diagram showing a configuration of a power conversion device 101 according to the second embodiment.

Referring to FIG. 6, the second embodiment is different from the first embodiment in that the turns ratio among windings 41 to 43 of transformer 40 is determined with a ratio of the rated output voltage between second DC terminal 21 and third DC terminal 31 on the secondary side (the load side) being reflected. The configuration other than the turns ratio in transformer 40 is similar to the configuration described with reference to FIG. 1.

The number of turns is substantially equal (the turns ratio being substantially 1:1) between winding 41 and winding 42 corresponding to the maximum load, by setting the rated output voltage from DC power supply 10 (the nominal value of DC voltage V1) substantially equally to the rated output voltage of second DC terminal 21 (the nominal value of DC voltage V2) connected to maximum load 20. Since the maximum value and the effective value are thus in common between AC voltage VT1 of primary-side winding 41 and AC voltage VT2 of secondary-side winding 42, design can be common between first bridge circuit 12 and second bridge circuit 22 with identical components being used. Design cost can thus be suppressed.

A turns ratio n between winding 42 and winding 43 is determined in accordance with a ratio between the rated output voltage of second DC terminal 21 (load 20) and the rated output voltage of third DC terminal 31 (load 30). For example, when DC voltage V2 has the rating of 600 (V) and DC voltage V3 has the rating of 200 (V), n is calculated as n=3. Consequently, relation of N41:N42:N43=n:n:1 is satisfied among the number of turns N41 of primary-side winding 41, the number of turns N42 of secondary-side winding 42, and the number of turns N43 of secondary-side winding 43. In other words, the turns ratio (n:n) between primary-side winding 41 and secondary-side winding 42 is closer to one than the turns ratio (n:1) between primary-side winding 41 and secondary-side winding 43.

Figure 7:
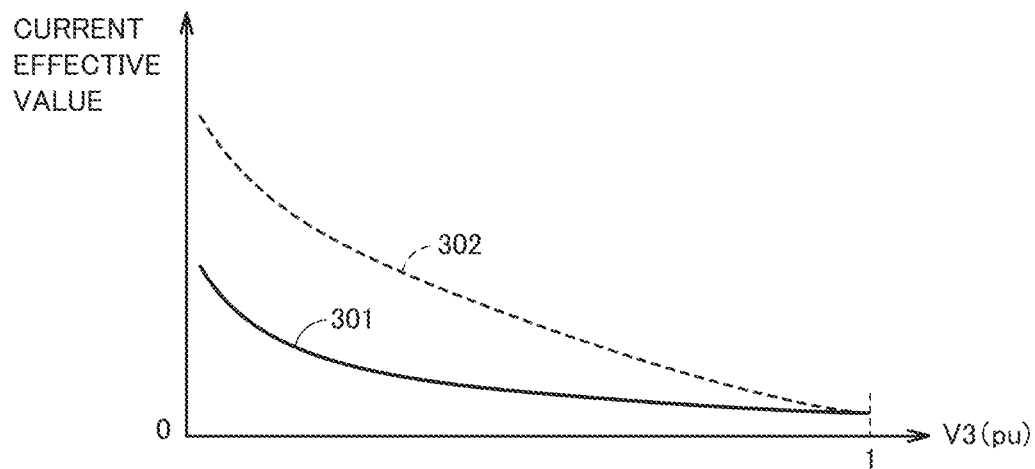
FIG. 7 shows a graph illustrating relation between an output voltage of the third DC terminal and a current in the third bridge circuit in the power conversion device according to the second embodiment.

FIG. 7 shows a graph illustrating relation between DC voltage V3 of third DC terminal 31 and a current in third bridge circuit 32 in power conversion device 101 according to the second embodiment.

The ordinate and the abscissa in FIG. 7 are similar to those in FIG. 5, and FIG. 7 shows with a reference 302, a curve of current effective value $IL_{13rms}$ of third bridge circuit 32 with respect to DC voltage V3 shown in FIG. 5. Reference 302 corresponds to characteristics when the turns ratio in transformer 40 is set to N41:N42:N43=1:1:1.

In contrast, when the turns ratio in transformer 40 is set to N41:N42:N43=n:n:1 in the second embodiment, $A_{13}$ and $B_{13}$ used in the expression (12) are modified as below, by conversion of DC voltage V3 with a voltage of secondary-side winding 43 in terms of primary-side winding 41.

$$A_{13}=(V1+n\cdot V3)/K_{13}$$

$$B_{13}=(V1-n\cdot V3)/K_{13}$$

FIG. 7 shows with a reference 301, a curve of current effective value $IL_{13rms}$ of third bridge circuit 32 with respect to DC voltage V3 in the second embodiment, which is obtained by plotting values obtained in accordance with the expression (12) by using modified $A_{13}$ and $B_{13}$.

In the second embodiment, as a result of setting of the turns ratio described above, a condition of $(V1-n\cdot V3)=0$ is satisfied and a condition of $B_{13}=0$ is satisfied. Though A13 increases depending on the number of turns n, $IL_{130}$ shown in the expression (10) also decreases owing to the effect of the condition of $B_{13}=0$. Therefore, with decrease in current maximum value $IL_{13p}$, values of coefficients $D_3$ to $D_1$ and constant $D_0$ in the expression (12) decrease, which means decrease in current value. Consequently, as is understood from comparison between the curve shown with reference 301 and the curve shown with reference 302, current effective value $IL_{13rms}$ and current maximum value $IL_{13p}$ in third bridge circuit 32 decrease in the second embodiment.

Thus, in addition to the effect in the first embodiment, power loss in power transmission to load 30 by third bridge circuit 32 is reduced so that power conversion device 101 can further be higher in efficiency. Cost for equipment can also be suppressed by suppressing a capacity of an element.

Regardless of which of a plurality of loads (loads 20 and 30 in FIG. 6) is the maximum load, setting of the turns ratio among the windings of the multiwinding transformer described in the second embodiment is similarly applicable. An effect the same as described in the second embodiment can be achieved specifically by setting the turns ratio between the primary-side winding (the power supply-side winding) and the secondary-side winding (the maximum load-side winding) connected to the maximum load to be closer to 1:1 than the turns ratio between the primary-side winding and another secondary-side winding and by setting the turns ratio between each secondary-side winding to which the load other than the maximum load is connected and the maximum load-side winding in accordance with a ratio between the rated output voltage to that load and the rated output voltage to the maximum load.

Third Embodiment

In the second embodiment, efficiency of the power conversion device is enhanced by suppressing a current in third bridge circuit 32 connected to load 30 different from the maximum load by setting the turns ratio in transformer 40 to N41:N42:N43=n:n:1 to satisfy a condition of $(V1-n\cdot V3)=0$, that is, $B_{13}=0$.

There is a concern, however, about failure in satisfying the condition $(V1-n\cdot V3)=0$ due to variation in DC voltage V3 to load 30 in power conversion device 101 in the second embodiment. In this case, under a condition of $B_{13} \neq 0$, a current in third bridge circuit 32 may increase and power loss may increase.

Therefore, in a third embodiment, the current effective value and the current maximum value in third bridge circuit 32 are suppressed by applying PWM control to third bridge circuit 32 in the configuration in the first or second embodiment.

Figure 8:
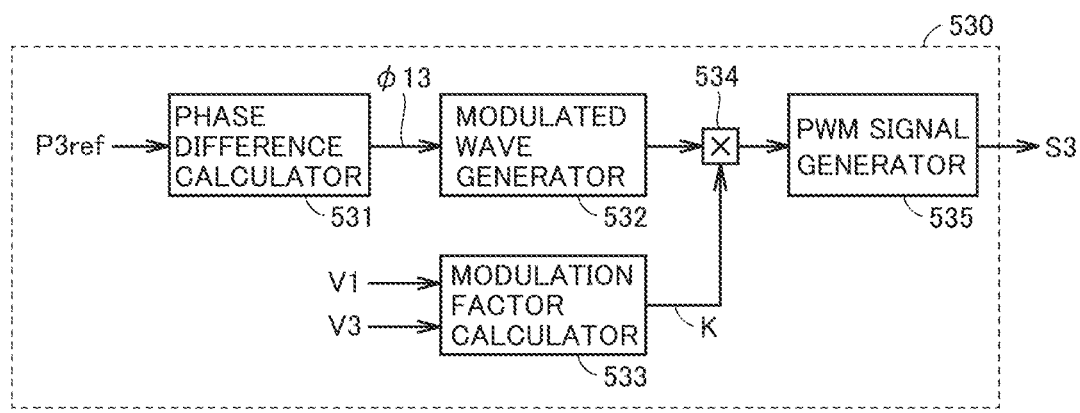
FIG. 8 is a functional block diagram illustrating a control configuration of the third bridge circuit in the power conversion device according to a third embodiment.

FIG. 8 is a functional block diagram illustrating a control configuration of third bridge circuit 32 in the power conversion device according to the third embodiment. A function of each block in the configuration shown in FIG. 8 can be performed by at least one of hardware processing and software processing by control device 50.

Referring to FIG. 8, control device 50 includes a controller 530 for third bridge circuit 32. Controller 530 generates a PWM control signal S3 for third bridge circuit 32. Gate signals S31 to S34 for switching elements Q31 to Q34 are generated based on PWM control signal S3. For example, gate signals S31 and S34 are signals in phase with control signal S3 and gate signals S32 and S33 are signals reverse in phase to control signal S3. Furthermore, a deadtime for turning off both of switching elements Q31 and Q32 is generally provided between gate signals S31 and S32 and gate signals S34 and S33.

Controller 530 includes a phase difference calculator 531, a modulated wave generator 532, a modulation factor calculator 533, a multiplier 534, and a PWM signal generator 535. The third embodiment is also on the premise that the nominal value of DC voltage V1 from DC power supply 10, that is, the rated output voltage from DC power supply 10, is set substantially equally to the rated output voltage of second DC terminal 21 (that is, the nominal value of the input voltage to maximum load 20) as described in the second embodiment (ideally V1=V2).

Phase difference calculator 531 calculates phase difference $\phi 13$ (FIG. 2) between AC voltage VT1 and AC voltage VT3 based on a power command value P3ref for transmission power from third DC terminal 31 to load 30.

Modulated wave generator 532 generates a modulated wave based on phase difference $\phi 13$. The modulated wave is provided as a rectangular wave voltage of 50(%) duty having phase difference $\phi 13$ from AC voltage VT1 in FIG. 2 and is identical in amplitude to carrier waves used in PWM signal generator 535. In general, in sinusoidal PWM, the modulated wave has a frequency of 50 (Hz) or 60 (Hz) which is substantially equal to the commercial system. In the third embodiment, however, the modulated wave has a frequency identical to the switching frequency of each of semiconductor switching elements Q11 to Q24 in second bridge circuit 22 and first bridge circuit 12 to which PWM control is not applied.

Modulation factor calculator 533 calculates a modulation factor K from a detection value of DC voltage V1 of first DC terminal 11 and a detection value of DC voltage V3 of third DC terminal 31, based on an expression (13) below, by using turns ratio n described above. Modulation factor K can be calculated as being restricted within a range of K≤1. In other words, when a condition of V1>(n/V3) is satisfied, modulation factor calculator 533 can provide K=1 in a fixed manner.

$$K = V1/(n \cdot V3) \quad (13)$$

Multiplier 534 multiplies the modulated wave from modulated wave generator 532 by modulation factor K calculated by modulation factor calculator 533.

PWM signal generator 535 generates PWM control signal S3 in accordance with comparison between the modulated wave multiplied by modulation factor K and carrier waves. As is known, carrier waves are composed of periodic signals such as triangular waves or sawtooth waves that are higher in frequency than the modulated wave.

When it is assumed that a condition of K≥1 is satisfied in the configuration in FIG. 8, the modulated waves generated in modulated wave generator 532 are provided to PWM signal generator 535 with the amplitude thereof being maintained or expanded, so that control signal S3 can be generated to turn off PWM control. While PWM control is off, AC voltage VT3 exhibits a waveform similar to that in FIG. 2. In other words, controller 530 in FIG. 8 can also control on and off of PWM control based on a result of calculation of modulation factor K.

Figure 9:
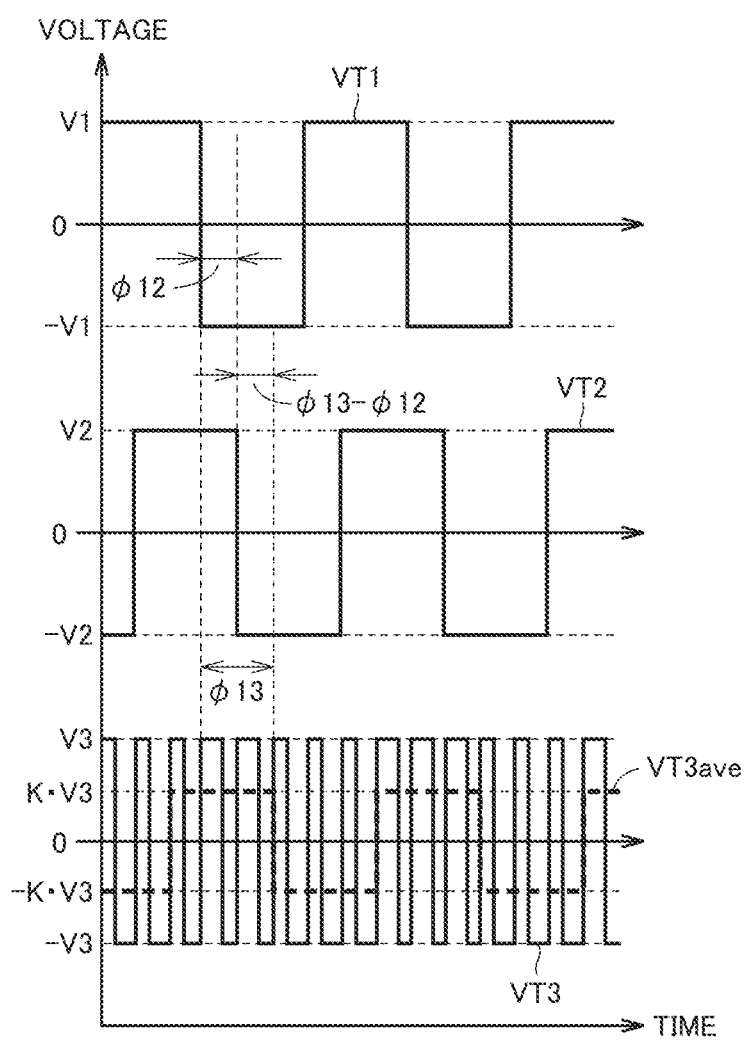
FIG. 9 is a waveform diagram of an AC voltage of each winding of the transformer in the power conversion device according to the third embodiment.

FIG. 9 is a waveform diagram of AC voltages VT1 to VT3 of windings 41 to 43 of transformer 40 in the power conversion device according to the third embodiment.

Referring to FIG. 9, AC voltages VT1 and VT2 as in FIG. 2 are applied to winding 41 and winding 42, respectively. In third bridge circuit 32, switching elements Q31 to Q34 are switched in accordance with a frequency of carrier waves, so that AC voltage VT3 under PWM control is applied to winding 43. An average voltage VT3ave for each modulated wave cycle of AC voltage VT3 exhibits a waveform in phase with AC voltage VT3 in FIG. 2 and K time (K<1) higher in amplitude (peak value) than that. Consequently, a difference between K·n·V3 and DC voltage V1 can be made smaller.

Figure 10:
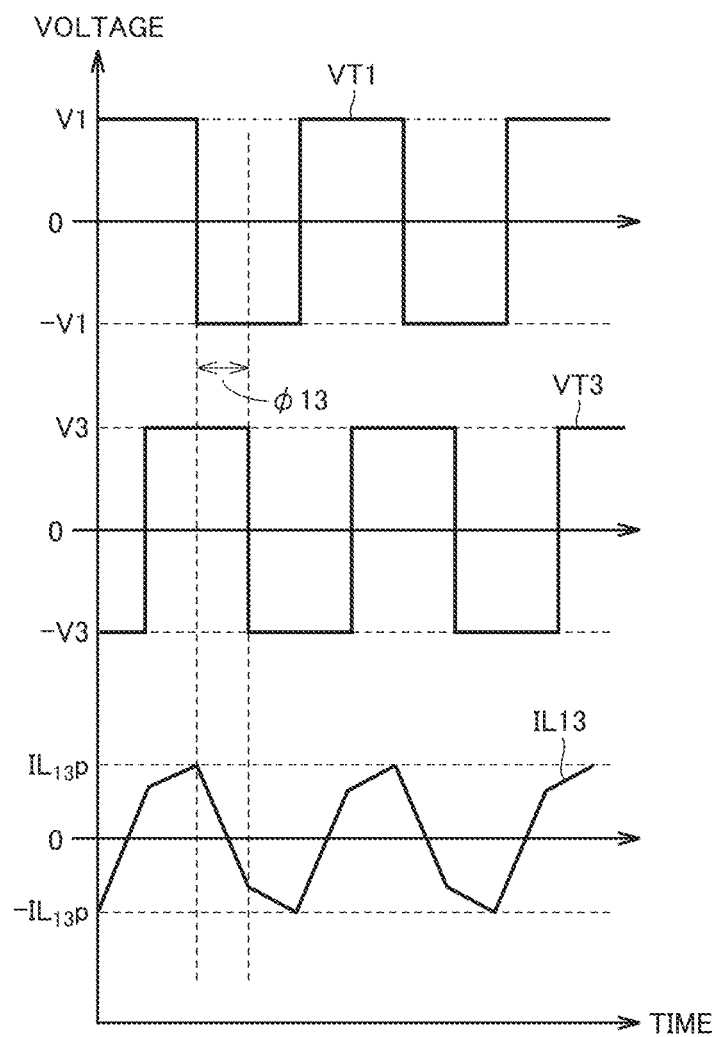
FIG. 10 is a waveform diagram of a current (when pulse width modulation is off) in the third bridge circuit in the power conversion device according to the third embodiment.
Figure 11:
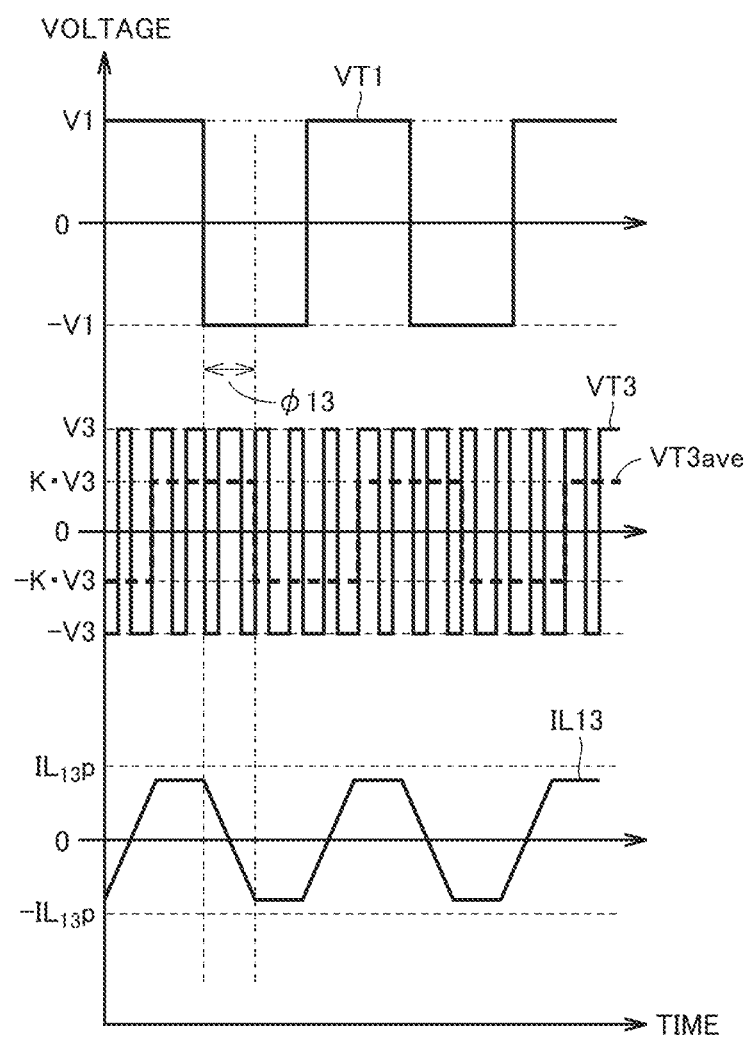
FIG. 11 is a waveform diagram of a current (when pulse width modulation is on) in the third bridge circuit in the power conversion device according to the third embodiment.

FIGS. 10 and 11 show a waveform of a current in third bridge circuit 32 in the power conversion device according to the third embodiment. FIG. 10 shows a waveform diagram when PWM control is off, in other words, when a condition of K=1 is satisfied, and FIG. 11 shows a waveform diagram when PWM control is on (K<1).

In FIG. 10, third bridge circuit 32 generates AC voltage VT3 as in FIG. 2 so that AC current IL13 in third bridge circuit 32 has the maximum value and the effective value in accordance with the expression (9) and the expression (12).

In contrast, in FIG. 11, third bridge circuit 32 generates AC voltage VT3 (FIG. 9) under PWM control shown in FIG. 9. By PWM with modulation factor K being set, $A_{13}$ and $B_{13}$ used in the expression (12) are modified as below, by conversion of DC voltage V3 with a voltage of secondary-side winding 43 in terms of primary-side winding 41.

$$A_{13} = (V1 + K \cdot n \cdot V3)/K_{13}$$

$$B_{13} = (V1 - K \cdot n \cdot V3)/K_{13}$$

With modulation factor K being set to satisfy the condition $K = V1/(n \cdot V3)$ as described above, a condition of $B_{13} = 0$ can be satisfied in spite of variation in DC voltage V3. Thus, the maximum value and the effective value of AC current IL13 that flows through third bridge circuit 32 are smaller in FIG. 11 than in FIG. 10.

Consequently, according to the power conversion device in the third embodiment, in spite of variation in DC voltage V3, by suppressing a current in third bridge circuit 32 connected to load 30 different from the maximum load as in the second embodiment, efficiency of the power conversion device can be enhanced and cost for equipment can be suppressed.

Fourth Embodiment

In PWM control described in the third embodiment, when modulation factor K is in a condition of $K = V1/(n \cdot V3) < 1$ due to variation in DC voltage V3, AC current IL13 in third bridge circuit 32 can be suppressed. On the other hand, the third embodiment is unable to address such variation in DC voltage V3 as leading to a condition of V1/(n·V3)>1. Therefore, in a fourth embodiment, how to address such variation in DC voltage V3 as leading to the condition of V1/(n·V3)>1 will be described.

Figure 12:
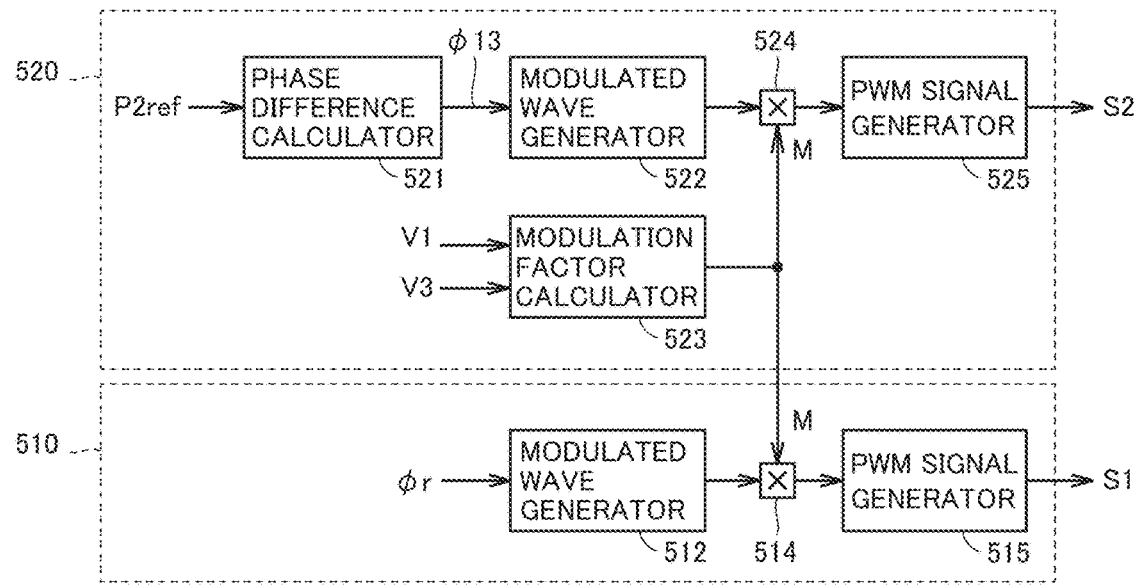
FIG. 12 is a functional block diagram illustrating a control configuration of the first and second bridge circuits in the power conversion device according to a fourth embodiment.

FIG. 12 is a functional block diagram illustrating a control configuration of the first and second bridge circuits in the power conversion device according to the fourth embodiment. A function of each block in the configuration shown in FIG. 12 can be performed by at least one of hardware processing and software processing by control device 50.

Referring to FIG. 12, control device 50 includes a controller 520 for second bridge circuit 22. Controller 520 generates a PWM control signal S2 for second bridge circuit 22. Gate signals S21 to S24 for switching elements Q21 to Q24 are generated based on PWM control signal S2. Since relation between gate signals S21 to S24 and PWM control signal S2 is similar to relation between gate signals S31 to S34 and PWM control signal S3 described above, detailed description will not be repeated.

Controller 520 includes a phase difference calculator 521, a modulated wave generator 522, a modulation factor calculator 523, a multiplier 524, and a PWM signal generator 525. The fourth embodiment is also on the premise that the nominal value of DC voltage V1 from DC power supply 10, that is, the rated output voltage from DC power supply 10, is set substantially equally to the rated output voltage of second DC terminal 21 (that is, the nominal value of the input voltage to maximum load 20) as described in the second embodiment (that is, ideally V1=V2).

Phase difference calculator 521 calculates phase difference $\phi 12$ (FIG. 2) between AC voltage VT1 and AC voltage VT2 based on a power command value P2ref for transmission power from second DC terminal 21 to load 20 (maximum load).

Modulated wave generator 522 generates a modulated wave based on phase difference $\phi 12$. The modulated wave is provided as a rectangular wave voltage of 50(%) duty having phase difference $\phi 12$ from AC voltage VT1 in FIG. 2 and is identical in amplitude to carrier waves used in PWM signal generator 525. In the fourth embodiment, the modulated wave has a frequency identical to the switching frequency of each of semiconductor switching elements Q31 to Q34 of third bridge circuit 32 to which PWM control is not applied.

Modulation factor calculator 523 calculates a modulation factor M from a detection value of DC voltage V1 of first DC terminal 11 and a detection value of DC voltage V3 of third DC terminal 31, based on an expression (14) below, by using turns ratio n described above. It is understood based on the expression (13) and the expression (14) that M is calculated as M=1/K. Modulation factor M can be calculated as being restricted within a range of M≤1. In other words, under a condition of (n·V3)>V1, modulation factor calculator 523 can provide M=1 in a fixed manner.

$$M=(n \cdot V3)/V1 \quad (14)$$

Multiplier 524 multiplies the modulated wave from modulated wave generator 522 by modulation factor M calculated by modulation factor calculator 523. PWM signal generator 515 generates PWM control signal S2 in accordance with comparison between the modulated wave multiplied by modulation factor M and carrier waves. Carrier waves are set as in PWM signal generator 535 in FIG. 8.

Under PWM control with modulation factor M being set, $A_{13}$ and $B_{13}$ used in the expression (12) are modified as below, by conversion of DC voltage V3 with a voltage of secondary-side winding 43 in terms of primary-side winding 41.

$$A_{13}=(M \cdot V1+n \cdot V3)/K_{13}$$

$$B_{13}=(M \cdot V1-n \cdot V3)/K_{13}$$

Therefore, even though a condition of K>1 is set in the third embodiment as a result of variation in DC voltage V3, a condition of $B_{13}=0$ can be satisfied by carrying out PWM control with modulation factor M (M<1) being set.

Since first bridge circuit 12 is subjected to PWM control with modulation factor M being set at this time, a peak value of an average value VT1ave of AC voltage VT1 is set to M×V1. Therefore, unless second bridge circuit 22 is also subjected to PWM control with modulation factor M being set, the current effective value within second bridge circuit 22 will increase. Therefore, in the fourth embodiment, PWM control in accordance with common modulation factor M should be applied also to second bridge circuit 22 in addition to first bridge circuit 12.

In the power conversion device according to the fourth embodiment, control device 50 further includes a controller 510 for first bridge circuit 12. Controller 510 generates a PWM control signal S1 for first bridge circuit 12. Gate signals S11 to S14 for switching elements Q11 to Q14 are generated based on PWM control signal S1. Since relation between gate signals S11 to S14 and PWM control signal S1 is also similar to relation between gate signals S31 to S34 and PWM control signal S3 described above, detailed description will not be repeated.

Controller 510 includes a modulated wave generator 512, a multiplier 514, and a PWM signal generator 515.

Modulated wave generator 512 generates a modulated wave having a fixed reference phase $\phi r$ which serves as the reference for phase differences $\phi 12$ and $\phi 13$. The modulated wave is provided as a rectangular wave voltage of 50(%) duty corresponding to AC voltage VT1 in FIG. 2 and is identical in amplitude to carrier waves used in PWM signal generator 515. The frequency of carrier waves is identical to the switching frequency of each of semiconductor switching elements Q11 to Q24 in second bridge circuit 22 and first bridge circuit 12.

Multiplier 514 multiplies the modulated wave from modulated wave generator 512 by modulation factor M in common to that for second bridge circuit 22 calculated by modulation factor calculator 523. PWM signal generator 515 generates PWM control signal S1 in accordance with comparison between the modulated wave multiplied by modulation factor M and carrier waves. Carrier waves are set as in PWM signal generator 535 in FIG. 8.

Figure 13:
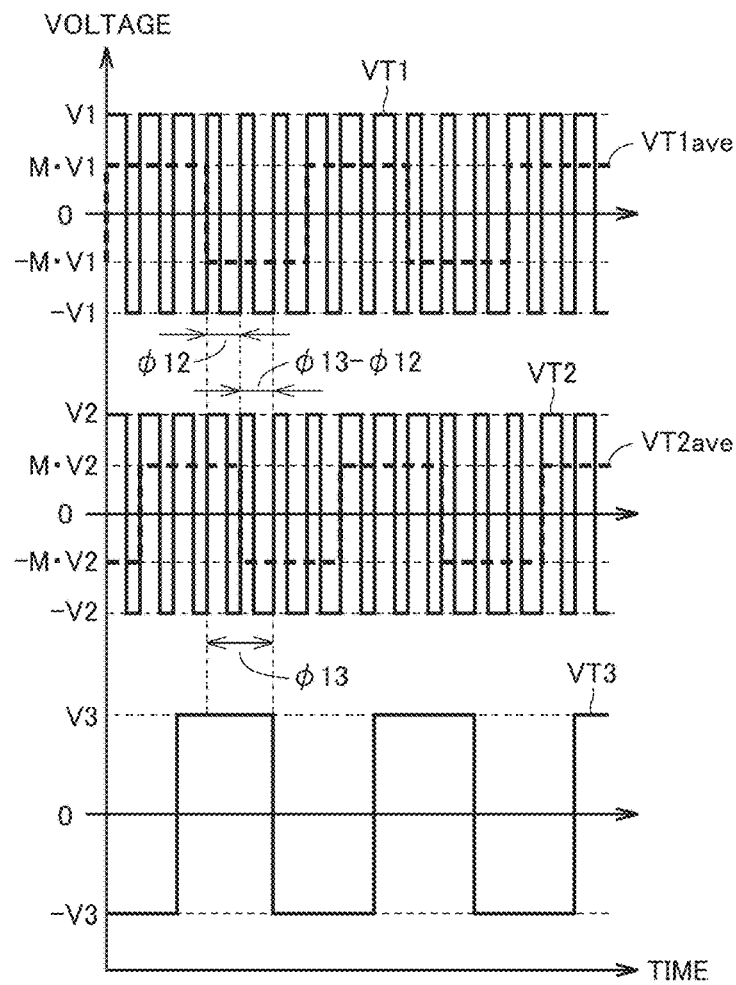
FIG. 13 is a waveform diagram of an AC voltage of each winding of the transformer in the power conversion device according to the fourth embodiment.

FIG. 13 is a waveform diagram of AC voltages VT1 to VT3 of windings 41 to 43 of transformer 40 in the power conversion device according to the fourth embodiment.

Referring to FIG. 13, since PWM control is turned off in third bridge circuit 32, AC voltage VT3 as in FIG. 2 is applied to winding 43. In first bridge circuit 12 and second bridge circuit 22, on the other hand, switching elements Q11 to Q14 and Q21 to Q24 are switched in accordance with a frequency of carrier waves, so that AC voltages VT1 and VT2 under PWM control are applied to windings 41 and 42, respectively.

Average voltage VT1ave for each modulated wave cycle of AC voltage VT1 exhibits a waveform in phase with AC voltage VT1 in FIG. 2 and M time (M<1) higher in amplitude (peak value) than that. Consequently, a difference between n·V3 and M·V1 can be made smaller.

Furthermore, an average voltage VT2ave for each cycle of AC voltage VT2 exhibits a waveform in phase with AC voltage VT2 in FIG. 2 and M time (M<1) higher in amplitude (peak value) than that. Therefore, increase in current effective value within second bridge circuit 22 due to excessively high AC voltage VT2 provided to second bridge circuit 22 can be prevented.

Consequently, according to the power conversion device in the fourth embodiment, even though DC voltage V3 varies to a range (K>1) that cannot be addressed in the third embodiment, a current in third bridge circuit 32 connected to load 30 different from the maximum load is suppressed as in the third embodiment so that efficiency of the power conversion device can be enhanced and cost for equipment can be suppressed.

When it is assumed that a condition of M≥1 is satisfied in the configuration in FIG. 12, the modulated waves generated in modulated wave generators 512 and 522 are provided to PWM signal generators 515 and 525 with the amplitude thereof being maintained or expanded, so that control signals S1 and S2 can be generated to turn off PWM control. While PWM control is off, AC voltages VT1 and VT2 exhibit waveforms similar to those in FIG. 2. In other words, controllers 510 and 520 in FIG. 12 can also equivalently switch on and off PWM control based on a result of calculation of modulation factor M.

Relation of M=1/K is satisfied between modulation factor K (the third embodiment) and modulation factor M (the fourth embodiment) as described above. Therefore, when a condition of K<1 is satisfied, a condition of M>1 is satisfied, whereas when a condition of K>1 is satisfied, a condition of M<1 is satisfied.

Therefore, on the assumption that control device 50 includes controller 530 shown in FIG. 8 and controllers 510 and 520 shown in FIG. 12, PWM control in first bridge circuit 12 and second bridge circuit 22 can be turned off when modulation factor calculator 533 calculates modulation factor M as M≥1, and PWM control in third bridge circuit 32 can be turned off when modulation factor calculator 523 calculates modulation factor K as K≥1. Consequently, control device 50 can be configured to automatically select one of control in the third embodiment and control in the fourth embodiment for addressing variation in DC voltage V3.

Fifth Embodiment

In the third and fourth embodiments, PWM control for maintaining suppression of the cross current ($B_{13}$=0) for addressing variation in DC voltage V3 to load 30 different from the maximum load is described.

On the other hand, the second embodiment is characterized in that the condition of $B_{12}$=0 is satisfied for $B_{12}$=(V1−V2)/$K_{12}$ used in the expression (7) and the expression (10) by setting a condition of V1=V2, and the third and fourth embodiments are also premised on the condition of V1=V2 as described above. Therefore, when DC voltage V2 to maximum load 20 varies, the condition of V1=V2 is not satisfied between DC voltage V1 and DC voltage V2, which results in $B_{12}$≠0. Then, there is a concern about lowering in efficiency of power conversion device 101. Therefore, in the fourth embodiment, PWM control to address variation in DC voltage V2 to maximum load 20 will be described.

Figure 14:
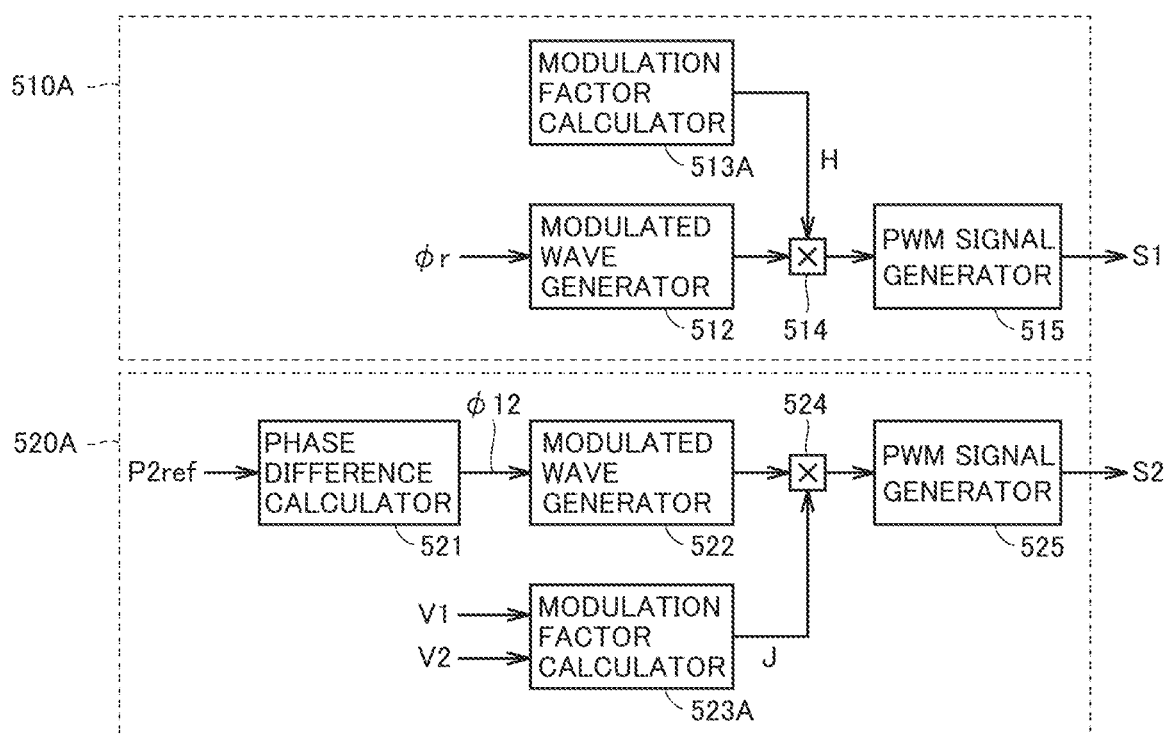
FIG. 14 is a functional block diagram illustrating a control configuration of first and second bridge circuits in the power conversion device according to a fifth embodiment.

FIG. 14 is a functional block diagram illustrating a control configuration of first and second bridge circuits in the power conversion device according to a fifth embodiment. A function of each block in the configuration shown in FIG. 14 can be performed by at least one of hardware processing and software processing by control device 50.

Referring to FIG. 14, control device 50 includes a controller 510A for first bridge circuit 12 and a controller 520A for second bridge circuit 22. Controller 510A further includes a modulation factor calculator 513A in addition to modulated wave generator 512, multiplier 514, and PWM signal generator 515 as in controller 510 in FIG. 12.

Modulation factor calculator 513A calculates a modulation factor H from a detection value of DC voltage V1 and a detection value of DC voltage V2, based on an expression (15) below.

$$H = V2/V1 \quad (15)$$

Multiplier 514 multiplies the modulated wave from modulated wave generator 512 by modulation factor H calculated by modulation factor calculator 513A. Consequently, when a condition of V2<V1, that is, H<1, is satisfied, PWM signal generator 515 generates control signal S1 such that first bridge circuit 12 carries out PWM control in accordance with modulation factor H. On the other hand, when a condition of V2≥V1, that is, H≥1, is satisfied, PWM signal generator 515 generates control signal S1 to turn off PWM control in first bridge circuit 12.

Controller 520A is different from controller 520 in FIG. 12 in including a modulation factor calculator 523A instead of modulation factor calculator 523. Modulation factor calculator 523A calculates a modulation factor J from a detection value of DC voltage V1 and a detection value of DC voltage V2, based on an expression (16) below.

$$J = V1/V2 \quad (16)$$

Controller 520A is different from controller 520 in FIG. 12 in carrying out PWM control with modulation factor J instead of modulation factor M. Consequently, when a condition of V1<V2, that is, J<1, is satisfied, PWM signal generator 525 generates control signal S2 such that second bridge circuit 22 carries out PWM control in accordance with modulation factor J. On the other hand, when a condition of V1≥V2, that is, J≥1, is satisfied, PWM signal generator 525 generates control signal S2 to turn off PWM control in second bridge circuit 22.

Relation of H=1/J is satisfied between modulation factors H and J. Therefore, when a condition of V2>V1 is satisfied, a condition of J<1 and H>1 on the other hand is satisfied, whereas when a condition of V1>V2 is satisfied, a condition of H<1 and J>1 on the other hand is satisfied.

Figure 15:
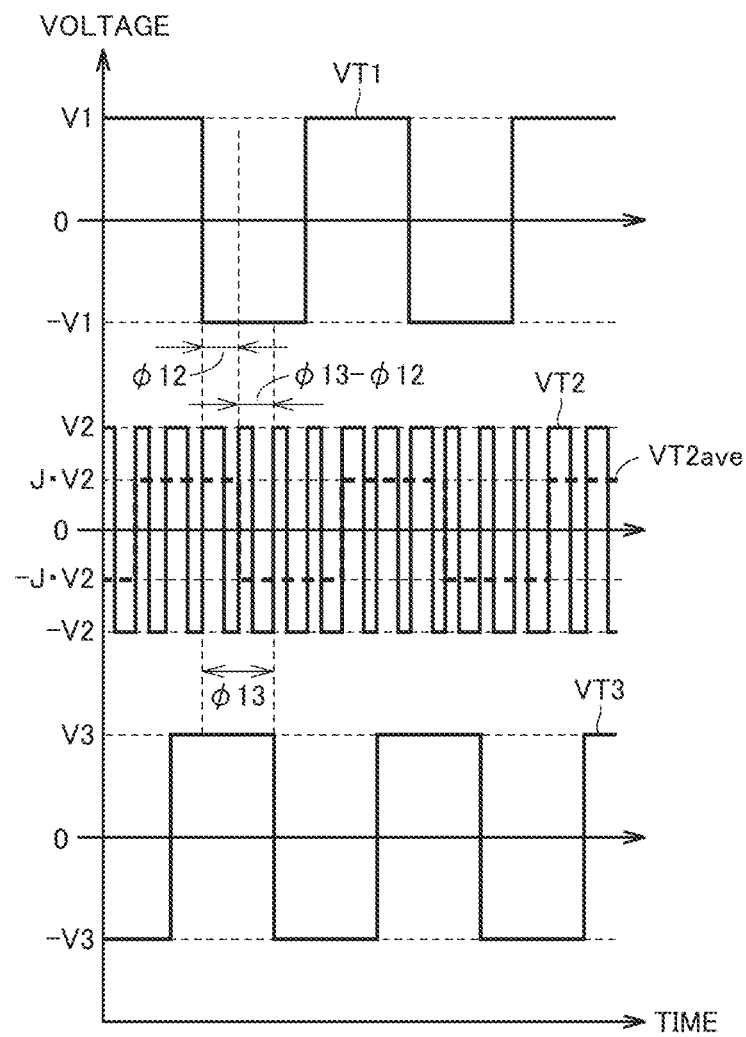
FIG. 15 is a waveform diagram showing a first example of an AC voltage of each winding of the transformer in the power conversion device according to the fifth embodiment.

FIG. 15 shows a waveform diagram at the time when the condition of V2>V1 is satisfied as a first example of an AC voltage of each winding of the transformer in the power conversion device according to the fifth embodiment.

Referring to FIG. 15, when the condition of V2>V1 is satisfied, the condition of J<1 is satisfied, so that PWM control in accordance with modulation factor J is carried out in second bridge circuit 22. Thus, an average voltage VT2ave for each modulated wave cycle of AC voltage VT2 provided by second bridge circuit 22 to winding 42 exhibits a waveform in phase with AC voltage VT3 in FIG. 2 and J time (J<1) higher in amplitude (peak value) than that.

Since the condition of H>1 is satisfied on the other hand, PWM control in first bridge circuit 12 is turned off. Therefore, AC voltages VT1 and VT3 as in FIG. 2 are applied to winding 41 and winding 43 by first bridge circuit 12 and third bridge circuit 32, respectively.

Consequently, $A_{12}$ and $B_{12}$ used in the expression (7) and the expression (10) are modified as below.

$$A_{12}=(V1+J\cdot V2)/K_{12}$$

$$B_{12}=(V1-J\cdot V2)/K_{12}$$

Since J is defined as J=(V1/V2) in the expressions above, it is understood that the condition of $B_{12}$=0 can be satisfied even though DC voltage V2 varies (increases).

Figure 16:
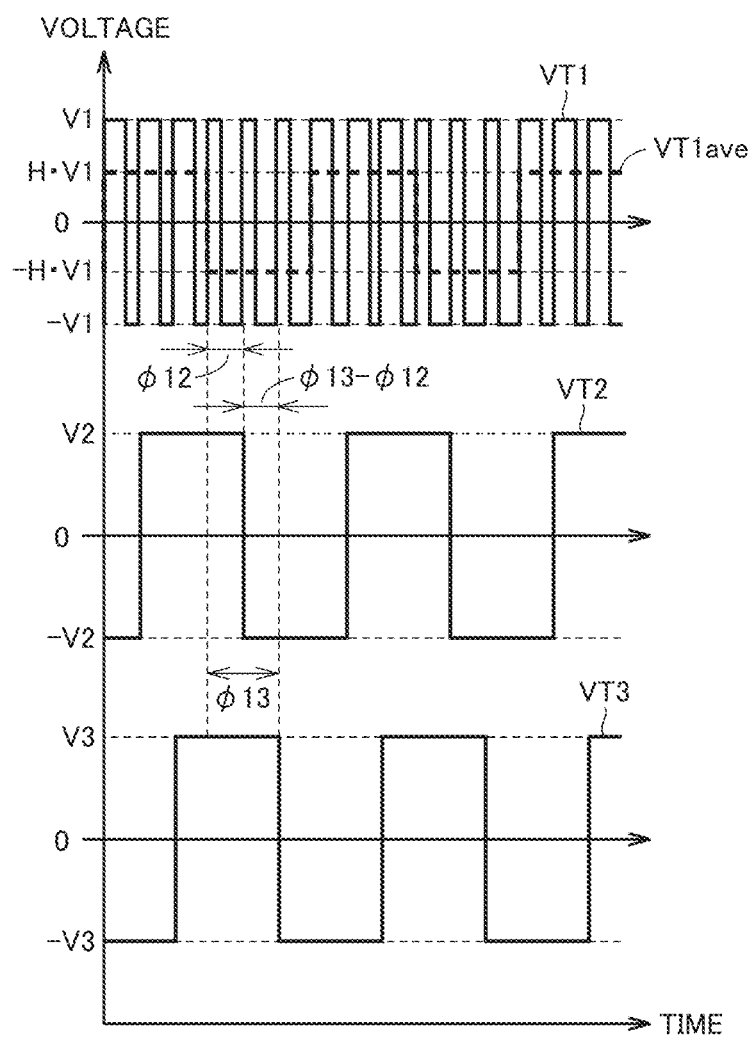
FIG. 16 is a waveform diagram showing a second example of an AC voltage of each winding of the transformer in the power conversion device according to the fifth embodiment.

FIG. 16 shows a waveform diagram at the time when the condition of V1>V2 is satisfied as a second example of an AC voltage of each winding of the transformer in the power conversion device according to the fifth embodiment.

Referring to FIG. 16, when the condition of V1>V2 is satisfied, the condition of H<1 is satisfied. Therefore, PWM control in accordance with modulation factor H is carried out in first bridge circuit 12. Average voltage VT1ave for each modulated wave cycle of AC voltage VT1 provided by first bridge circuit 12 to winding 41 thus exhibits a waveform in phase with AC voltage VT1 in FIG. 2 and H time (H<1) higher in amplitude (peak value) than that.

Since the condition of J>1 is satisfied on the other hand, PWM control in second bridge circuit 22 is turned off. Therefore, AC voltages VT2 and VT3 as in FIG. 2 are applied to winding 42 and winding 43 from second bridge circuit 22 and third bridge circuit 32, respectively.

Consequently, $A_{12}$ and $B_{12}$ used in the expression (7) and the expression (10) are modified as below.

$$A_{12}=(H\cdot V1+V2)/K_{12}$$

$$B_{12}=(H\cdot V1-V2)/K_{12}$$

Since H is defined as H=(V2/V1) in the expressions above, it is understood that the condition of $B_{12}$=0 can be satisfied even though DC voltage V2 varies (increases).

Thus, according to the power conversion device in the fifth embodiment, even though DC voltage V2 to maximum load 20 varies (increases or lowers), efficiency of the power conversion device can be enhanced and cost for equipment can be suppressed by suppressing a current in second bridge circuit 22 connected to maximum load 20.

Though a control example in which PWM control is turned off for third bridge circuit 32 is described with reference to FIGS. 15 and 16, the fifth embodiment can also be combined with the third embodiment so that controller 530 in FIG. 8 controls third bridge circuit 32. In this case, when DC voltage V3 increases to satisfy a condition of (n·V3)>V1 (that is, K<1), the cross current between second bridge circuit 22 and third bridge circuit 32 can further be suppressed.

Application of PWM control in the fifth embodiment can also be restricted depending on modulation factors H and J (J=1/H).

Figure 17:
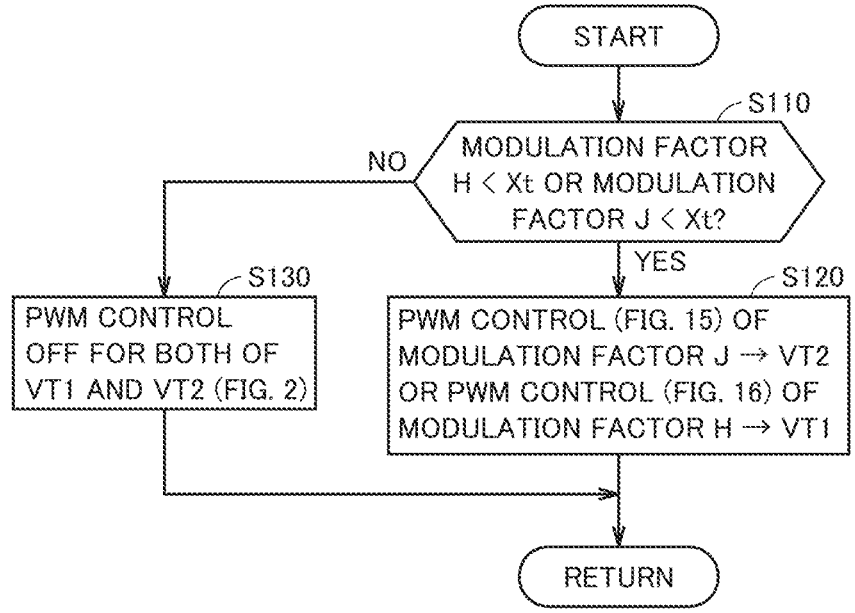
FIG. 17 is a flowchart illustrating pulse width modulation (PWM) control processing in the power conversion device according to the fifth embodiment.

FIG. 17 is a flowchart illustrating processing for controlling on and off of PWM control in the control device according to the fifth embodiment.

Referring to FIG. 17, control device 50 compares calculated modulation factors H and J with a predetermined threshold value Xt (0<Xt<1) in a step (which is simply denoted as "S" below) 110. When modulation factor H or J is lower than threshold value Xt, in S120, PWM control in accordance with one of modulation factors H and J is turned on as described in the fifth embodiment. Specifically, when a condition of modulation factor J<Xt is satisfied, AC voltage VT2 provided from second bridge circuit 22 is subjected to PWM control in accordance with modulation factor J (FIG. 15). In contrast, when a condition of modulation factor H<Xt is satisfied, AC voltage VT1 provided from first bridge circuit 12 is subjected to PWM control in accordance with modulation factor H (FIG. 16).

When both of modulation factors H and J are equal to or higher than threshold value Xt (determination as NO in S110), in S130, PWM control in accordance with modulation factors H and J is applied to neither of AC voltage VT1 provided from first bridge circuit 12 and AC voltage VT2 provided from second bridge circuit 22 (turned off). PWM control as above can be turned on and off, for example, by output of H=1 in a fixed manner by modulation factor calculator 513A when the condition of H Xt is satisfied and by output of J=1 in a fixed manner by modulation factor calculator 513A when the condition of J Xt is satisfied.

Similarly, application of PWM control in the third and fourth embodiments can also be restricted in accordance with modulation factors H and J (J=1/H).

Figure 18:
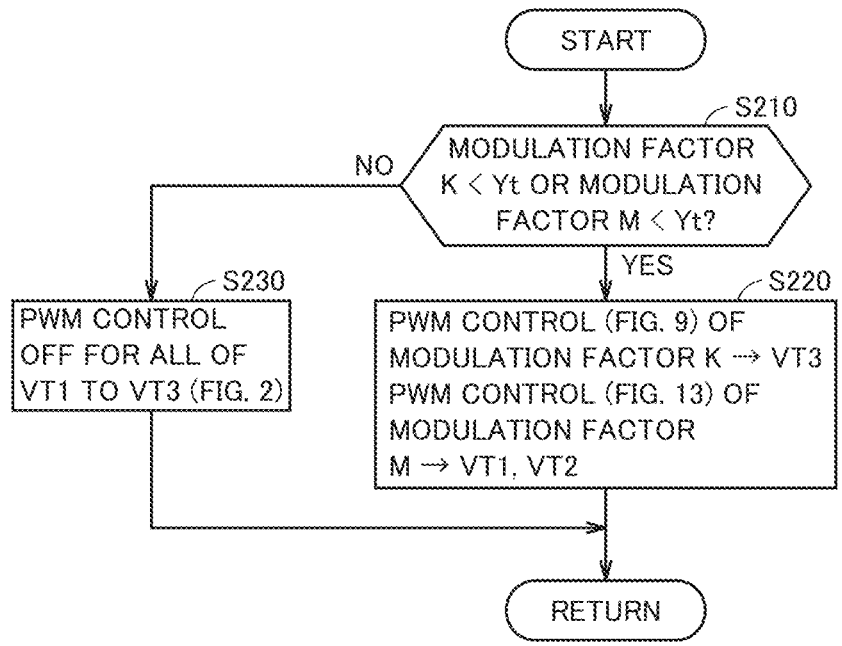
FIG. 18 is a flowchart illustrating processing for controlling on and off of PWM control in the power conversion device according to the third and fourth embodiments.

FIG. 18 is a flowchart illustrating processing for controlling on and off of PWM control in the power conversion device according to the third and fourth embodiments.

Referring to FIG. 18, in S210, control device 50 compares calculated modulation factors K and M with a predetermined threshold value Yt (0<Yt<1). When modulation factor K or M is lower than threshold value Yt, in S220, PWM control in accordance with one of modulation factors K and M is turned on as described in the third and fourth embodiments. Specifically, when a condition of modulation factor K<Yt is satisfied, AC voltage VT3 provided from third bridge circuit 32 is subjected to PWM control in accordance with modulation factor K (FIG. 9) as described in the third embodiment. In contrast, when a condition of modulation factor M<Yt is satisfied, AC voltages VT1 and VT2 provided from first bridge circuit 12 and second bridge circuit 22 are subjected to PWM control in accordance with modulation factor M (FIG. 13) as described in the fourth embodiment.

When both of modulation factors K and M are equal to or higher than threshold value Yt (determination as NO in S210), in S230, PWM control in accordance with modulation factors K and M is applied to none of AC voltages VT1 to VT3 provided from first bridge circuit 12, second bridge circuit 22, and third bridge circuit 32. PWM control as above can be turned on and off, for example, by output of K=1 in a fixed manner by modulation factor calculator 533 when a condition of K≥Yt is satisfied and by output of M=1 in a fixed manner by modulation factor calculator 523 when a condition of M≥Yt is satisfied.

PWM control according to the fifth embodiment cannot be combined with the fourth embodiment (FIG. 13) in which PWM control is carried out in both of first bridge circuit 12 and second bridge circuit 22. Therefore, when both of lowering in modulation factor H or J due to variation in DC voltage V2 and lowering in modulation factor M due to variation in DC voltage V3 occur, priority should be set between PWM control according to the fifth embodiment and PWM control according to the fourth embodiment.

Figure 19:
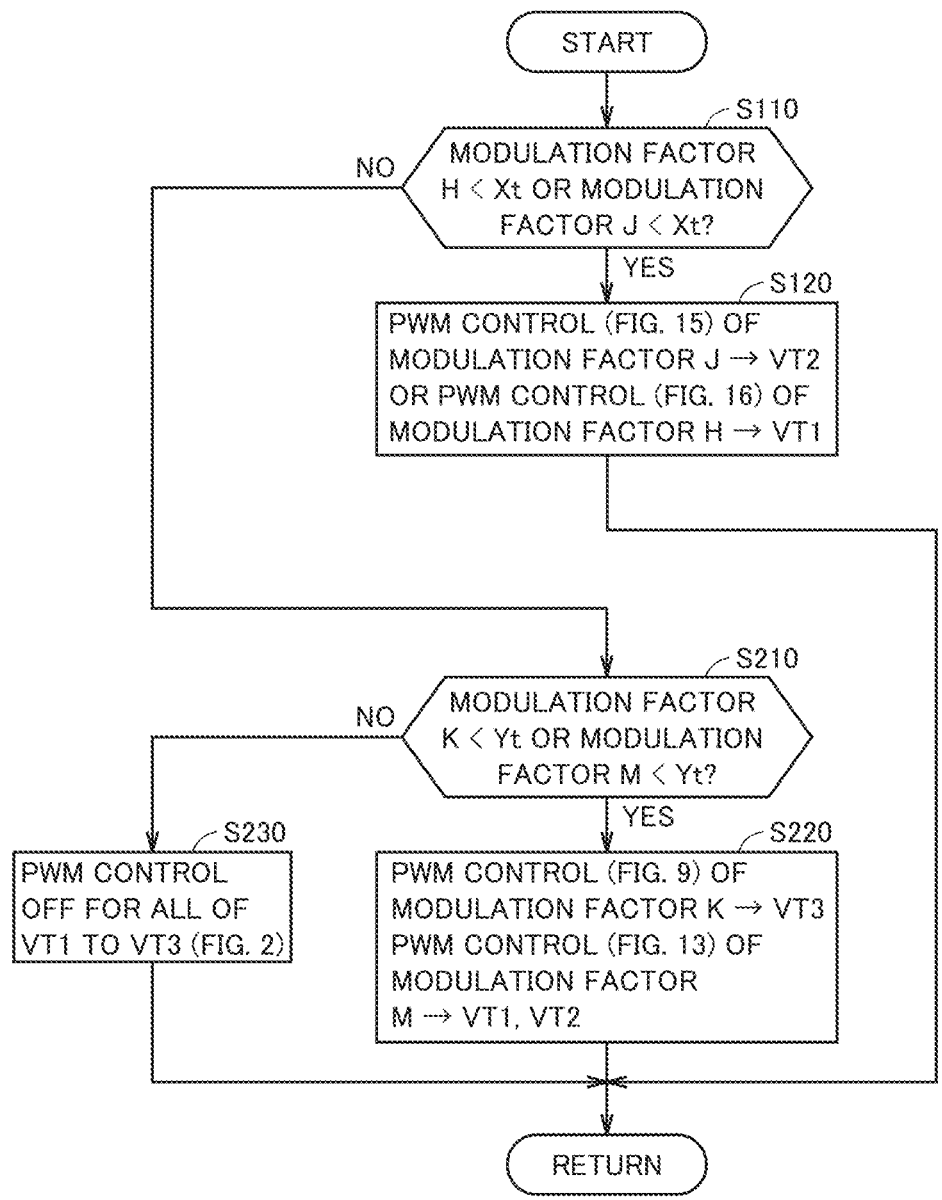
FIG. 19 is a flowchart illustrating processing for controlling priority of PWM control described in the third to fifth embodiments.

FIG. 19 is a flowchart illustrating processing for controlling priority of PWM control described in the third to fifth embodiments.

Referring to FIG. 19, in S110 as in FIG. 17, control device 50 determines whether or not PWM control for addressing variation in DC voltage V2 to maximum load 20 is necessary, and when modulation factor H or J is lower than threshold value Xt (determination as YES in S110), PWM control described in the fifth embodiment is preferentially carried out in S120 as in FIG. 17.

When modulation factor H or J or both of threshold values Xt is/are equal to or higher than threshold value Xt (determination as NO in S110), that is, only when PWM control for addressing variation in DC voltage V2 is not necessary, control device 50 performs processing in S210 to S230 as in FIG. 18. Thus, when modulation factor K or M is lower than threshold value Yt due to variation in DC voltage V3 (determination as YES in S210), PWM control described in the third or fourth embodiment is carried out in S220 as in FIG. 18. In contrast, when modulation factors K and M are equal to or higher than threshold value Yt (determination as NO in S210), PWM control is applied to none of AC voltages VT1 to VT3 in S230 as in FIG. 18 (FIG. 2).

In accordance with the priority in FIG. 19, efficiency of the power conversion device as a whole can be enhanced by preferentially suppressing loss in power transmission to maximum load 20 owing to PWM control according to the fifth embodiment.

In the exemplary configuration in FIGS. 1 and 6, first DC terminal 11 corresponds to one embodiment of the "primary-side DC terminal," and second DC terminal 21 and third DC terminal 31 correspond to one embodiment of the "plurality of secondary-side DC terminals." In transformer 40 which is the multiwinding transformer, winding 41 corresponds to one embodiment of the "primary-side winding" and windings 42 and 43 correspond to one embodiment of the "plurality of secondary-side windings." Bridge circuit 12 corresponds to one embodiment of the "primary-side bridge circuit" and second bridge circuit 22 and third bridge circuit 32 correspond to one embodiment of the "plurality of secondary-side bridge circuits."

Winding 42 strongest in magnetic coupling to winding 41 of windings 42 and 43 that constitute the "plurality of secondary-side windings" corresponds to one embodiment of the "first secondary-side winding" and winding 43 relatively weak in magnetic coupling to winding 41 corresponds to one embodiment of the "second secondary-side winding." Furthermore, second DC terminal 21 corresponding to winding 42 of the "plurality of secondary-side DC terminals" corresponds to one embodiment of the "first secondary-side DC terminal" and second bridge circuit 22 corresponds to one embodiment of the "first secondary-side bridge circuit." Similarly, third DC terminal 31 corresponding to winding 43 corresponds to one embodiment of the "second secondary-side DC terminal" and third bridge circuit 32 corresponds to one embodiment of the "third secondary-side bridge circuit."

The configurations of the power conversion devices shown in FIGS. 1 and 6 are by way of example and the number of arranged secondary-side bridge circuits corresponding to the number of arranged secondary-side windings and the number of windings in the multiwinding transformer may be set to three or more. In this case as well, a similar effect can be achieved by intentionally differentiating magnetic coupling between the plurality of secondary-side windings and the primary-side winding to similarly provide the "first secondary-side winding (strongest in magnetic coupling)" and the "second secondary-side winding (relatively weak in magnetic coupling)". In other words, the power conversion devices described in the first to fifth embodiments and the DC power distribution system in which a load is further connected to the former can be applied in common to the configuration to transmit electric power to a plurality of loads connected to a plurality of secondary-side (load-side) windings.

The configuration of the bridge circuit can also be different from the configurations in FIGS. 1 and 6 so long as DC/AC power conversion can be carried out in application of the first and second embodiments and so long as bidirectional DC/AC power conversion under PWM control can be carried out in application of the third to fifth embodiments.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST

10 DC power supply; 11 first DC terminal (primary-side DC terminal); 12 first bridge circuit (primary-side bridge circuit); 13 first AC terminal; 20 load (maximum load); 30 load; 21 second DC terminal (secondary-side DC terminal); 22 second bridge circuit (secondary-side bridge circuit); 23 second AC terminal; 31 third DC terminal (secondary-side DC terminal); 32 third bridge circuit (secondary-side bridge circuit); 33 third AC terminal; 40 multiwinding transformer; 41 winding (primary-side winding); 42, 43 winding (secondary-side winding); 44 core; 45 magnetic leg; 50 control device; 100, 101 power conversion device; 510, 510A, 520, 520A, 530 controller; 512, 522, 532 modulated wave generator; 513A, 523, 523A, 533 modulation factor calculator; 514, 524, 534 multiplier; 515, 525, 535 PWM signal generator; 521, 531 phase difference calculator; Cdc1 to Cdc3 DC capacitor; H, J, K, M modulation factor; LS12, LS13, LS23 leakage inductance; NL1 to NL3, PL1 to PL3 power line; P2ref, P3ref power command value (transmission power); Q11 to Q14, Q21 to Q24, Q31 to Q34 semiconductor switching element; S1, S2, S3 PWM control signal; S11 to S14, S21 to S24, S31 to S34 gate signal; V1 to V3 DC voltage; VT1ave, VT2ave, VT3ave average voltage; VT1 to VT3 AC voltage; d1, d2 inter-winding distance

The invention claimed is:
1. A power conversion device comprising:
a multiwinding transformer including a primary-side winding and a plurality of secondary-side windings;
a primary-side DC terminal connected to a DC power supply;
a plurality of secondary-side DC terminals;
a primly-side bridge circuit connected between the primary-side DC terminal and the primary-side winding, the primary-side bridge circuit carrying out DC/AC power conversion;
a plurality of secondary-side bridge circuits connected between the plurality of secondary-side windings and the plurality of secondary-side DC terminals, respectively, the plurality of secondary-side bridge circuits carrying out AC/DC power conversion; and
a control device to control the primary-side bridge circuit and the plurality of secondary-side bridge circuits,
the plurality of secondary-side windings including
a first secondary-side winding strongest in magnetic coupling to the primary-side winding, and
a second secondary-side winding weaker in magnetic coupling to the primary-side winding than the first secondary-side winding,
wherein a leakage inductance between the primary-side winding and the second secondary-side winding is greater than a leakage inductance between the primary-side winding and the first secondary-side winding,
the plurality of secondary-side DC terminals including
a first secondary-side DC terminal electrically connected to the first secondary-side winding with a first secondary-side bridge circuit of the plurality of secondary-side bridge circuits being interposed, and
a second secondary-side DC terminal electrically connected to the second secondary-side winding with a second secondary-side bridge circuit of the plurality of secondary-side bridge circuits being interposed, wherein the control device includes
a first controller to control the primary-side bridge circuit so as to provide a first AC voltage having a reference phase,
a second controller to control the first secondary-side bridge circuit so as to provide a second AC voltage having a first phase difference from the reference phase, and
a third controller to control the second secondary-side bridge circuit so as to provide a third AC voltage having a second phase difference from the reference phase, and
the first secondary-side DC terminal and the second secondary-side DC terminal supply output voltages different from each other,
a rated output voltage of the DC power supply is substantially equal to a rated output voltage of the first secondary-side DC terminal, and
a turns ratio between the primary-side winding and the first secondary-side winding is closer to one than a turns ratio between the primary-side winding and the second secondary-side winding.

2. The power conversion device according to claim 1, wherein
magnetic coupling between the first secondary-side winding and the second secondary-side winding is weaker than magnetic coupling between the second secondary-side winding and the primary-side winding.

3. The power conversion device according to claim 1, wherein
the turns ratio between the first secondary-side winding and the second secondary-side winding complies with a ratio between the rated output voltage of the first secondary-side DC terminal and a rated output voltage of the second secondary-side DC terminal.

4. The power conversion device according to claim 1, wherein
the first phase difference is set in accordance with a transfer power command value from the first secondary-side DC terminal, and
the second phase difference is set in accordance with a transfer power command value from the second secondary-side DC terminal.

5. The power conversion device according to claim 1, wherein
the DC power supply provides a first DC voltage to the primary-side DC terminal, and
when a second DC voltage in terms of the primary-side winding which is provided from the first secondary-side DC terminal becomes higher than the first DC voltage due to variation in second DC voltage, the second controller applies pulse width modulation control to the second AC voltage in accordance with a first modulation factor calculated by dividing the first DC voltage by the second DC voltage in terms of the primary-side winding.

6. The power conversion device according to claim 5, wherein
when the second DC voltage in terms of the primary-side winding which is provided from the first secondary-side; DC terminal becomes lower than the first DC voltage due to variation in second DC voltage, the first controller applies pulse width modulation control to the first AC voltage in accordance with a second modulation factor calculated by dividing the second DC voltage in terms of the primary-side winding by the first DC voltage, and
when both of the first and second modulation factors are equal to or higher than a predetermined threshold value within a range smaller than one, pulse width modulation control is applied to neither of the first AC voltage and the second AC voltage.

7. The power conversion device according to claim 6, wherein
when both of the first and second modulation factors are equal to or higher than the threshold value and when a third DC voltage in terms of the primary-side winding which is provided from the second secondary-side DC terminal becomes higher than the first DC voltage due to variation in third DC voltage, the third controller applies pulse width modulation control to the third AC voltage in accordance with a modulation factor calculated by dividing the first DC voltage by the third DC voltage in terms of the primary-side winding.

8. The power conversion device according to claim 6, wherein when both of the first and second modulation factors are equal to or higher than the threshold value and when a third DC voltage in terms of the primary-side winding which is provided from the second secondary-side DC terminal becomes lower than the first DC voltage due to variation in third DC voltage, the first and second controllers apply pulse width modulation control to both of the first and second AC voltages in accordance with a modulation factor calculated by dividing the third DC voltage in terms of the primary-side winding by the first DC voltage.

9. The power conversion device according to claim 1, wherein
the DC power supply provides a first DC voltage to the primary-side DC terminal, and
when a second DC voltage in terms of the primary-side winding which is provided from the first secondary-side DC terminal becomes lower than the first DC voltage due to variation in second DC voltage, the first controller applies pulse width modulation control to the first AC voltage in accordance with a second modulation factor calculated by dividing the second DC voltage in terms of the primary-side winding by the first DC voltage.

10. The power conversion device according to claim 1, wherein
the DC power supply provides a first DC voltage to the primary-side DC terminal, and
when a third DC voltage in terms of the primary-side winding which is provided from the second secondary-side DC terminal becomes higher than the first DC voltage due to variation in third DC voltage, the third controller applies pulse width modulation control to the third AC voltage in accordance with a. third modulation fa for calculated by dividing the first DC voltage by the third DC voltage in terms of the primary-side winding.

11. The power conversion device according to claim 10, wherein
when the third DC voltage in terms of the primary-side winding becomes lower than the first DC voltage due to variation in third DC voltage, the first and second controllers apply pulse width modulation control to both of the first and second AC voltages in accordance with a fourth modulation factor calculated by dividing the third DC voltage in terms of the primary-side winding by the first DC voltage, and when both of the third and fourth modulation factors are equal to or higher than a predetermined threshold value within a range smaller than one, pulse width modulation control is applied to none of the first AC voltage, the second AC voltage, and the third AC voltage.

12. The power conversion device according to claim 1, wherein the DC power supply provides a first DC voltage to the primary-side DC terminal, and when a third DC voltage in terms of the primary-side winding which is provided from the second secondary-side DC terminal becomes lower than the first DC voltage due to variation in third DC voltage, the first and second controllers apply pulse width modulation control to both of the first and second AC voltages in accordance with a fourth modulation factor calculated by dividing the third. DC voltage in terms of the primary-side winding by the first DC voltage.

13. The power conversion device according to claim I, wherein a rating power of a load connected to the first secondary-side DC terminal is larger than a rating power of a load connected to the second secondary-side DC terminal.

14. The power conversion device according to claim I, wherein the multiwinding transformer further includes a core, and the primary-side winding, the first secondary-side winding, and the second secondary-side winding are wound around an identical magnetic leg of the core, and arranged in an order of the first secondary-side winding, the primary-side winding, and the second secondary-side winding from an inner side.

15. A DC power distribution system comprising:

the power conversion device according to claim 1; and a plurality of loads connected to the plurality of secondary-side DC terminals and supplied with DC power, respectively, wherein a load maximum in power consumption among the plurality of loads is connected to the first secondary-side DC terminal.

\* \* \* \* \*